(12) United States Patent
Suematsu et al.

(10) Patent No.: US 7,020,890 B1
(45) Date of Patent: Mar. 28, 2006

(54) MILLIMETER WAVE TRANSMITTER, MILLIMETER WAVE RECEIVER AND MILLIMETER WAVE COMMUNICATION SYSTEM ENABLING SIMPLIFICATION OF WIRING AND IMPROVEMENT IN DEGREE OF FREEDOM FOR SETTING RECEIVER IN RECEIVING SYSTEM FOR TERRESTRIAL BROADCASTING AND SATELLITE BROADCASTING

(75) Inventors: Eiji Suematsu, Nara (JP); Tamotsu Aoki, Otawara (JP); Yasuo Ogata, Yaita (JP); Masami Suzuki, Nasu-gun (JP); Toshio Nakamura, Otawara (JP); Yoshinori Seki, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/521,240

(22) Filed: Apr. 5, 2000

(30) Foreign Application Priority Data

Apr. 5, 1999 (JP) ............................ 11-097129
Nov. 18, 1999 (JP) ............................ 11-327809

(51) Int. Cl.
*H04N 7/18* (2006.01)

(52) U.S. Cl. .................... 725/78; 725/82; 725/85; 455/11.1

(58) Field of Classification Search ............ 725/78–85, 725/120, 123, 131, 139, 151; 455/11.1, 7
See application file for complete search history.

(56) References Cited

U.S. PATENT DOCUMENTS

| 4,340,975 | A | * | 7/1982 | Onishi et al. ............... 455/315 |
| 4,472,685 | A | * | 9/1984 | Dutasta ..................... 329/325 |
| 5,200,826 | A | * | 4/1993 | Seong ........................ 348/731 |
| 5,208,740 | A | * | 5/1993 | Ehsani ....................... 363/124 |
| 5,321,736 | A | * | 6/1994 | Beasley ..................... 455/11.1 |
| 5,363,116 | A | * | 11/1994 | Allen ......................... 343/881 |
| 5,437,051 | A | * | 7/1995 | Oto ........................... 455/3.02 |
| 5,535,435 | A | * | 7/1996 | Balzano et al. .......... 455/575.7 |
| 5,557,290 | A | * | 9/1996 | Watanabe .................. 343/713 |
| 5,625,883 | A | * | 4/1997 | Leyten et al. ............. 455/41.1 |
| 5,636,244 | A | * | 6/1997 | Goodson et al. ............ 375/231 |
| 5,694,138 | A | * | 12/1997 | Crosby ...................... 343/704 |

(Continued)

FOREIGN PATENT DOCUMENTS

JP        55-13445        7/1978

(Continued)

OTHER PUBLICATIONS

DX Antenna Co., Ltd. DX antenna catalogue, pp248-253 (1998).

*Primary Examiner*—Chris Kelley
*Assistant Examiner*—Annan Q. Shang
(74) *Attorney, Agent, or Firm*—Birch, Stewart, Kolasch & Birch, LLP

(57) ABSTRACT

In order to receive satellite broadcasting (BS and CS) and terrestrial broadcasting (VHF and UHF), complicated wiring is required in a personal residence for transmitting broadcasting signals to a plurality of TV receivers while new distributors must be additionally set for installing additional TV receivers in a condominium previously provided with distributors limiting the number of settable TV receivers. The inventive millimeter wave communication system forms power supply paths by simply connecting a BS/CS antenna with a millimeter wave transmitter and connecting an electronic apparatus such as a TV receiver with a millimeter wave receiver through connectors or the like while transmitting/receiving broadcasting signals by millimeter wave radio communication without employing wires such as coaxial cables indoors.

49 Claims, 17 Drawing Sheets

U.S. PATENT DOCUMENTS

| | | | |
|---|---|---|---|
| 5,712,602 A | 1/1998 | Suematsu | |
| 5,820,464 A * | 10/1998 | Parlato | 464/58 |
| 5,832,365 A * | 11/1998 | Chen et al. | 455/15 |
| 5,835,128 A * | 11/1998 | Macdonald et al. | 725/81 |
| 5,861,855 A * | 1/1999 | Arsenault et al. | 343/704 |
| 5,929,814 A * | 7/1999 | Grossman et al. | 343/702 |
| 5,949,472 A * | 9/1999 | Dang et al. | 725/28 |
| 5,953,045 A * | 9/1999 | Tanishima | 725/119 |
| 6,006,069 A * | 12/1999 | Langston | 455/62 |
| 6,137,280 A * | 10/2000 | Ackermann et al. | 323/354 |
| 6,150,987 A * | 11/2000 | Sole et al. | 343/757 |
| 6,160,993 A * | 12/2000 | Wilson | 455/12.1 |
| 6,201,820 B1* | 3/2001 | Palmer | 372/32 |
| 6,222,882 B1* | 4/2001 | Lee et al. | 375/240.16 |
| 6,237,380 B1* | 5/2001 | Kanamori | 72/14.8 |
| 6,253,060 B1* | 6/2001 | Komara et al. | 455/9 |
| 6,406,314 B1* | 6/2002 | Byrne | 439/215 |
| 6,525,855 B1* | 2/2003 | Westbrook et al. | 398/168 |
| 6,553,020 B1* | 4/2003 | Hughes et al. | 370/347 |
| 6,650,359 B1* | 11/2003 | Park | 348/148 |

FOREIGN PATENT DOCUMENTS

| | | |
|---|---|---|
| JP | 59-147343 | 10/1984 |
| JP | 63-227220 | 9/1988 |
| JP | 63-198233 | 12/1988 |
| JP | 04-135328 | 5/1992 |
| JP | 04-189036 | 7/1992 |
| JP | 5-18179 | 3/1993 |
| JP | 05-136715 | 6/1993 |
| JP | 5-63169 | 8/1993 |
| JP | 05-218923 | 8/1993 |
| JP | 08-032479 | 2/1996 |
| JP | 09-182064 | 7/1997 |
| JP | 09-238113 | 9/1997 |
| JP | 09-261611 | 10/1997 |
| JP | 10-209908 | 8/1998 |
| JP | 11-041581 | 2/1999 |

* cited by examiner

SIGNAL INPUT TO FREQUENCY ARRANGER

SIGNAL OUTPUT FROM FREQUENCY ARRANGER

SIGNAL OUTPUT FROM MILLIMETERWAVE UPCONVERTER

OUTPUT FROM INVERSE FREQUENCY ARRANGER

FIG.12

INFORMATION CHANNEL

NOW,TRANSMITING EACH CHANNEL OF
CS BROADCASTING.

VTR IS RECORDING CS CHANNEL,
SO,YOU CANNOT CHANGE TO VHF,UHF,
BS BROADCASTING TRANSMISSION.

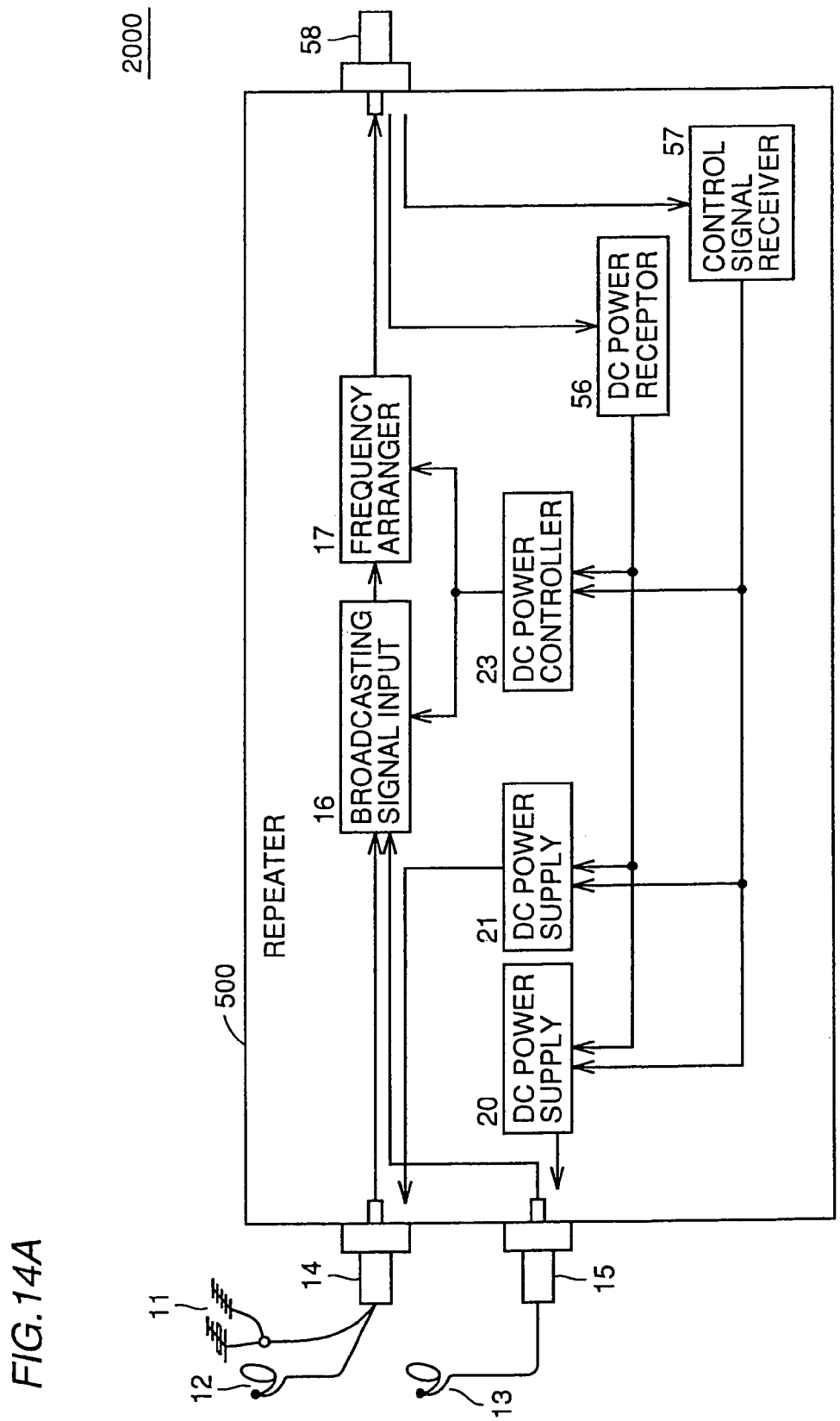

MILLIMETER WAVE TRANSMITTER, MILLIMETER WAVE RECEIVER AND MILLIMETER WAVE COMMUNICATION SYSTEM ENABLING SIMPLIFICATION OF WIRING AND IMPROVEMENT IN DEGREE OF FREEDOM FOR SETTING RECEIVER IN RECEIVING SYSTEM FOR TERRESTRIAL BROADCASTING AND SATELLITE BROADCASTING

BACKGROUND OF THE INVENTION

1. Field of the Invention

The present invention relates to a millimeter wave transmitter, a millimeter wave receiver, a millimeter wave communication system, a repeater and an electronic apparatus for radio-transmitting a plurality of broadcasting waves of terrestrial broadcasting such as VHF/UHF broadcasting or satellite broadcasting such as BS (broadcasting satellite) broadcasting or CS (communication satellite) broadcasting in millimeter waves indoors.

2. Description of the Background Art

At present, broadcasting is implemented over a plurality of radio bands for terrestrial broadcasting (UHF and VHF) and satellite broadcasting (BS and CS).

FIG. 16 illustrates the structure of a conventional TV broadcasting receiving system 800 in a personal residence.

The TV broadcasting receiving system 800 receives satellite broadcasting signals of the 12 GHz band in a BS antenna 71 and a CS antenna 72 respectively. Low-noise converters 73 mounted in close proximity to the respective antennas 71 and 72 convert the received radio waves to an intermediate frequency band of 1 to 2 GHz. Coaxial cables 74 and 75 transmit the converted signals to indoor TV receivers 76 (BS/CS tuners or TVs storing BS/CS tuners) from outside. Terrestrial broadcasting signals of a radio frequency band received in a UHF antenna 77 and a VHF antenna 78 are transmitted to the indoor TV receivers 76 through a coaxial cable 79 after mixed with each other (or independently of each other).

FIG. 17 illustrates the structure of a conventional TV broadcasting receiving system 900 in a condominium.

As shown in FIG. 17, the TV broadcasting receiving system 900 receives satellite broadcasting waves in a BS antenna 84 and a CS antenna 85 respectively and converts the same to an intermediate frequency band of 1 to 2 GHz. After the frequency conversion, a block converter 80 mixes the CS and BS signals with terrestrial broadcasting VHF/UHF signals of a radio frequency band received in a UHF antenna 77 and a VHF antenna 78, so that the mixed signals are transmitted through a single coaxial cable 81. The signals transmitted through the coaxial cable 81 are distributed to each household or each room through distributors 82 and an amplifier 83.

In the personal residence, however, complicated wiring is required for transmitting the broadcasting signals to a plurality of TV receivers. In the condominium, all broadcasting signals are transmitted to each household through the single coaxial cable 81. However, the distributors 82 are previously set to limit the number of mountable TV receivers. In order to install additional TV receivers, therefore, electric work for additionally setting new distributors or the like is required.

Particularly in order to use a movable liquid crystal TV or the like in a kitchen not wired with the aforementioned antennas in general, the coaxial cable 81 must be extended to the kitchen through a connector provided in a living room and the distributors 82 or the antennas must be wired to the kitchen through an additionally provided distributor.

Further, antenna wires must also be extended in order to change the position of a large-sized TV receiver set in the living room or the like.

SUMMARY OF THE INVENTION

An object of the present invention is to provide a millimeter wave communication system for transmitting satellite broadcasting (BS and CS) and terrestrial broadcasting (VHF and UHF) through millimeter waves indoors, eliminating complicated wiring and enabling improvement in degree of freedom for setting a receiver.

Another object of the present invention is to provide a millimeter wave transmitter and a millimeter wave receiver for implementing the aforementioned millimeter wave communication system.

Briefly stated, the present invention is directed to a millimeter wave transmitter for performing millimeter wave radio transmission indoors, which comprises a connection unit, a power supply circuit, a broadcasting wave input circuit, a broadcasting wave modulation circuit and a millimeter wave transmission circuit.

The connection unit is connectable with an antenna receiving a plurality of broadcasting waves. The power supply circuit supplies driving power to the antenna through the connection part. The broadcasting wave input circuit receives the plurality of broadcasting waves through the connection part and converts the broadcasting waves to broadcasting signals corresponding to the broadcasting waves respectively. The broadcasting wave modulation circuit up-converts the broadcasting signals to millimeter waves to be transmitted/received indoors. The millimeter wave transmission circuit transmits the millimeter waves.

According to another aspect of the present invention, a millimeter wave receiver for performing millimeter wave radio transmission indoors comprises a millimeter wave receiving circuit, a broadcasting wave demodulation circuit, a connection unit and a power receptor circuit.

The millimeter wave receiving circuit receives millimeter waves, obtained by up-converting a plurality of broadcasting waves, to be transmitted/received indoors. The broadcasting wave demodulation circuit down-converts the millimeter waves to the frequency band of the broadcasting waves. The connection unit is connectable with a connector provided on an electronic apparatus having a function of receiving broadcasting. The power receptor circuit receives driving power of the millimeter wave receiver through the connection part.

According to still another aspect of the present invention, a millimeter wave communication system for performing millimeter wave radio transmission indoors comprises a millimeter wave transmitter and a millimeter wave receiver.

The millimeter wave transmitter transmits millimeter wave signals in the millimeter wave radio transmission. The millimeter wave transmitter includes a first connection unit connectable with an antenna receiving a plurality of broadcasting waves, a power supply circuit supplying driving power to the antenna through the first connection part, a broadcasting wave input circuit receiving the plurality of broadcasting waves through the first connection part and converting the broadcasting waves to broadcasting signals corresponding to the broadcasting waves respectively, a broadcasting wave modulation circuit up-converting the broadcasting signals to millimeter waves to be transmitted/ received indoors, and a millimeter wave transmission circuit transmitting the millimeter waves.

The millimeter wave receiver receives the millimeter wave signals in the millimeter wave radio transmission. The millimeter wave receiver includes a millimeter wave receiving circuit receiving the millimeter waves, a broadcasting wave demodulation circuit down-converting the millimeter waves to the frequency band of the broadcasting waves, a second connection unit connectable with a connector provided on an electronic apparatus having a function of receiving broadcasting waves, and a power receptor circuit receiving driving power of the millimeter wave receiver through the second connection part.

Therefore, a principal advantage of the present invention resides in that broadcasting waves can be transmitted through millimeter wave radio communication indoors without employing wires such as coaxial cables by forming power supply paths by simply connecting a BS/CS antenna with the millimeter wave transmitter and connecting the electronic apparatus such as a TV receiver with the millimeter wave receiver through connectors or the like. Consequently, neither additional antenna work nor complicated wiring is required for setting additional TV receivers or the like. Further, a miniature TV, a personal computer provided with a TV tuner or a video camera can be freely used indoors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 illustrates exemplary display of an information channel;

FIGS. 14A and 14B are block diagrams showing the structure of a millimeter wave transmission system 2000 having a repeater according to a second embodiment of the present invention;

DESCRIPTION OF THE PREFERRED EMBODIMENTS

According to the present invention, satellite broadcasting (BS and CS) and terrestrial broadcasting (UHF and VHF) are radio-transmitted indoors by millimeter wave transmission of the 60 GHz band.

Millimeter waves of the 60 GHz band, extremely higher in frequency than the current satellite and terrestrial TV broadcasting waves for allowing a large radio bandwidth of transmitters/receivers, can collectively radio-transmit terrestrial and satellite broadcasting signals. In this frequency band, shielding between adjacent houses is readily attained due to large absorption by oxygen/moisture. In this frequency band, a half wavelength of 2.5 mm in the air is substantially identical to the chip size of an integrated circuit, and allows integration with the integrated circuit inclusive of an antenna. Therefore, a lightweight miniature radio module can be built into an electronic apparatus. Thus, this frequency band is suitable for indoor radio transmission.

First Embodiment

Figure 1A:
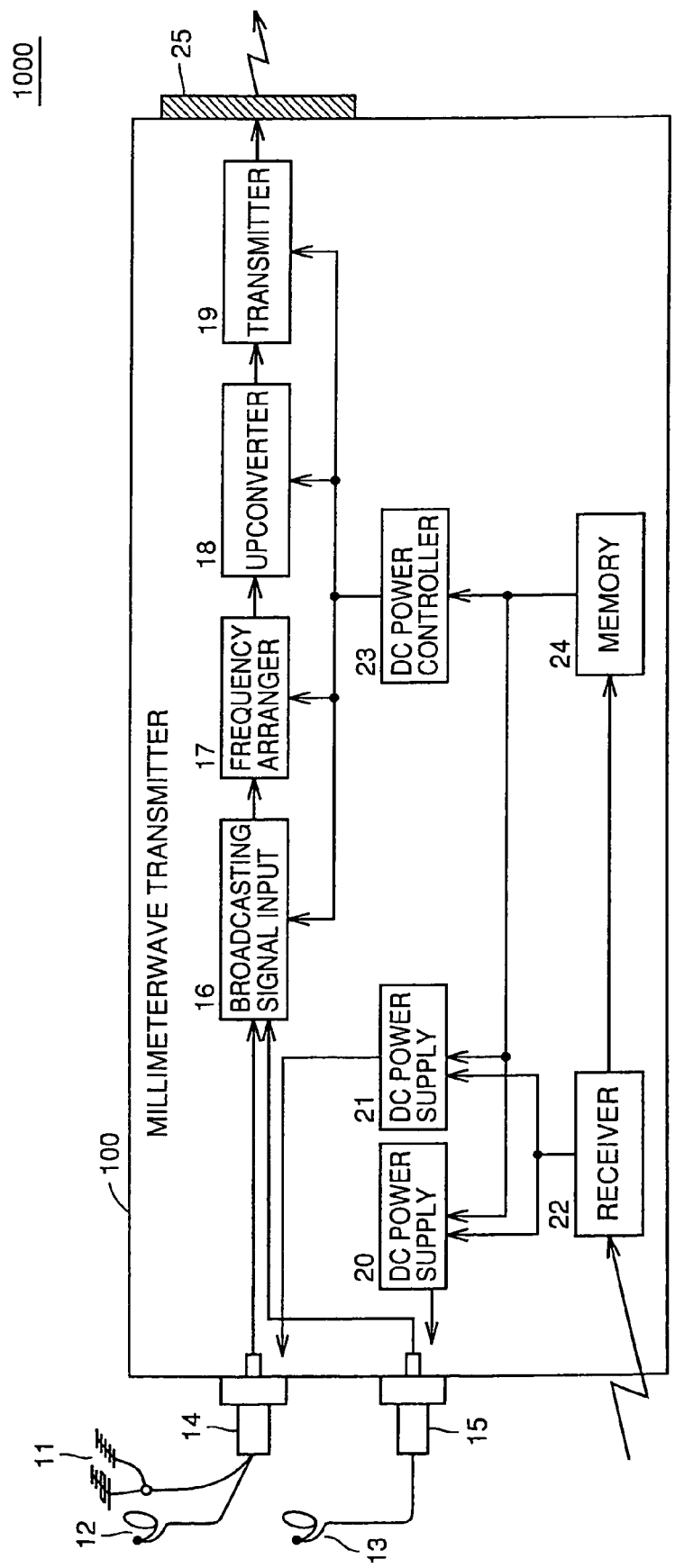
FIGS. 1A and 1B are block diagrams showing the structure of a millimeter wave communication system 1000 according to a first embodiment of the present invention.

FIG. 1A is a block diagram showing the structure of a millimeter wave transmitter 100 forming a millimeter wave communication system 1000 according to a first embodiment of the present invention.

The millimeter wave transmitter 100 includes a VHF/UHV antenna 11, a BS antenna 12, a CS antenna 13, a connector 14, another connector 15, a broadcasting signal input 16, a frequency arranger 17, an up converter 18, a transmitter 19, a DC power supply 20, another DC power supply 21, a receiver 22, a DC power controller 23, a memory 24 and a millimeter wave antenna 25.

Figure 1B:
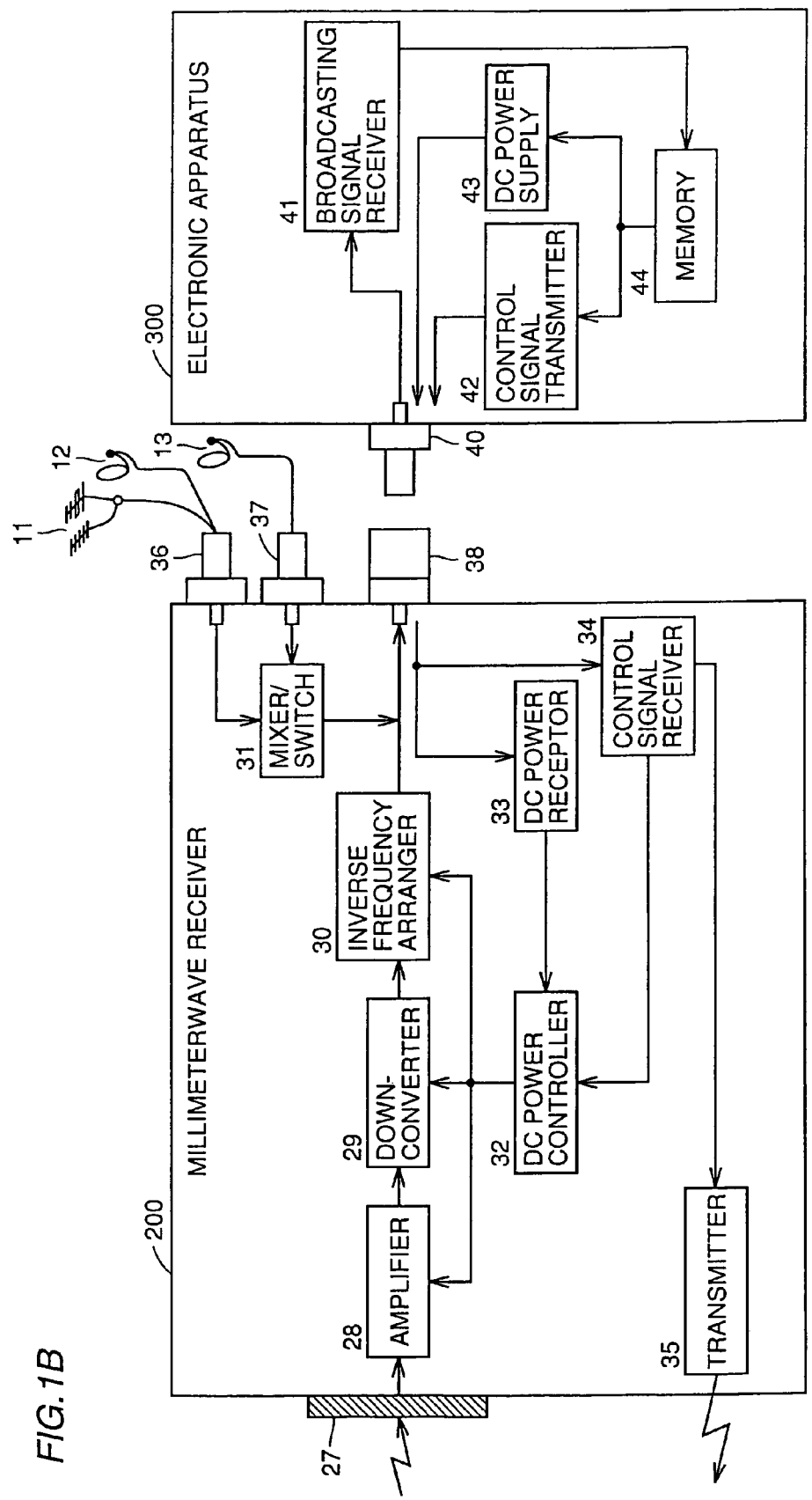

FIG. 1B is a block diagram showing the structure of a millimeter wave receiver 200 and an electronic apparatus 300 forming a millimeter wave communication system 1000 according to a first embodiment of the present invention.

Referring to FIG. 1B, a millimeter wave receiver 200 includes a millimeter wave antenna 27, an amplifier 28, a down converter 29, an inverse frequency arranger 30, a mixer/switch 31, a DC power controller 32, a DC power receptor 33, a control signal receiver 34, a transmitter 35, a connector 36, another connector 37 and still another connector 38.

An electronic apparatus 300 includes a connector 40, a broadcasting signal receiver 41, a control signal transmitter 42, a DC power supply 43 and a memory 44.

When formed by a TV receiver, for example, the electronic apparatus includes a display (not shown in FIG. 1B) or the like in addition to the aforementioned components.

A millimeter wave receiving circuit described in claims includes the millimeter wave antenna 27 and the amplifier 28 in FIG. 1B, and the amplifier 28 may be combined with a proper filter or the like.

Basic millimeter wave transmission parts in the millimeter wave transmitter 100 and the millimeter wave receiver 200 are first described.

The VHF/UHF antenna 11, the BS antenna 12 and the CS antenna 13 input radio waves from terrestrial broadcasting and satellite broadcasting in the connectors 14 and 15. While FIG. 1A shows two connectors 14 and 15, the number of such connectors is not restricted to two but an arbitrary number of connectors may be provided in response to the situation of connection. While the millimeter wave transmitter 100 is connected with the antennas 11 to 13 in this embodiment, the transmitter 100 may alternatively be connected with a terminal collectively supplying broadcasting waves from a synergic system for CATV or the like. The broadcasting waves input from the connectors 14 and 15 are supplied to the broadcasting signal input 16. The broadcasting signal input 16, which is formed by an amplifier having a gain properly set in response to a frequency band, a modulation system etc. in general, supplies amplified broadcasting waves to the frequency arranger 17.

Figure 2:
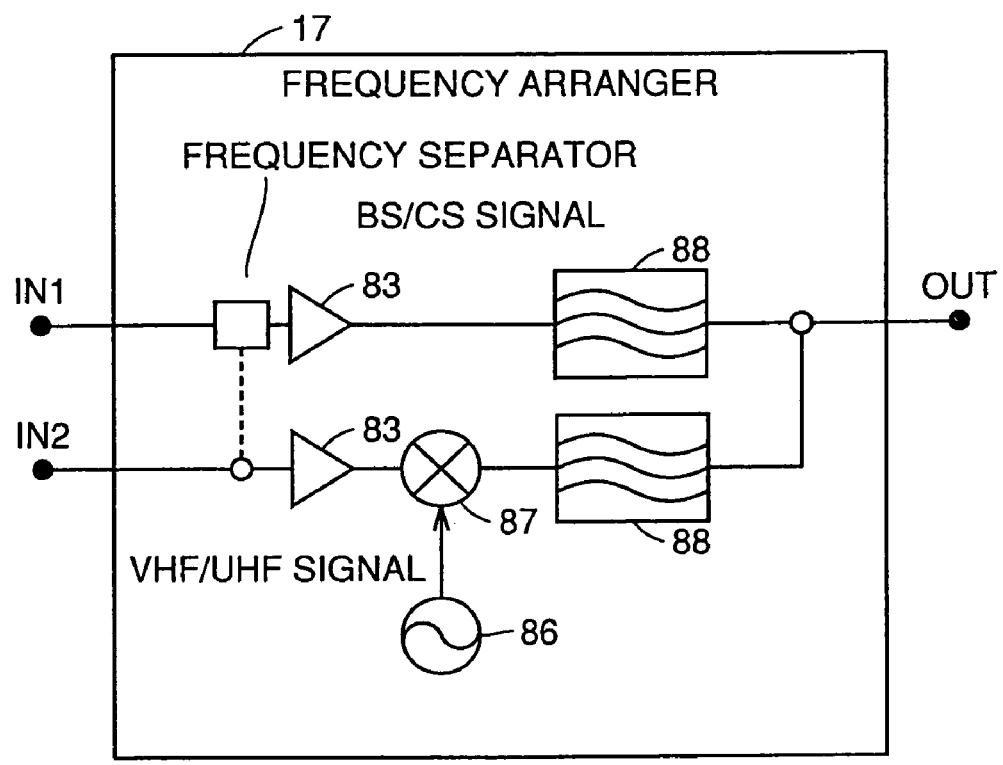
FIG. 2 illustrates the structure of a frequency arranger 17.

FIG. 2 illustrates the structure of the frequency arranger 17. FIGS. 3A to 3D illustrate the frequency arrangement of the parts in the millimeter wave communication system 1000.

Figure 3A:
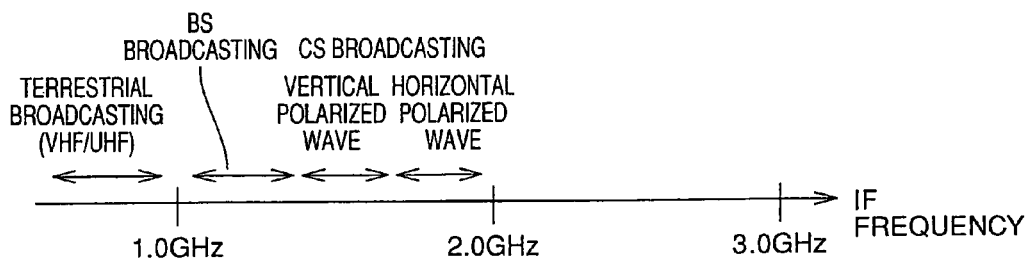
FIGS. 3A to 3D illustrate the frequency arrangement of respective parts in the millimeter wave communication system 1000.

In synergic receiving, a block converter (not shown) provided between the connector 15 and the CS antenna 13 arranges intermediate frequencies of CS and BS signals in the signals input in the frequency arranger 17 on the intermediate frequency axis of 1035 MHz to 1895 MHz, as shown in FIG. 3A. Referring to FIG. 2, the frequency arranger 17 frequency-converts only the input signal of terrestrial broadcasting with a mixer 87 and a local oscillator 86 and arranges the signals on the frequency axis.

Figure 3B:
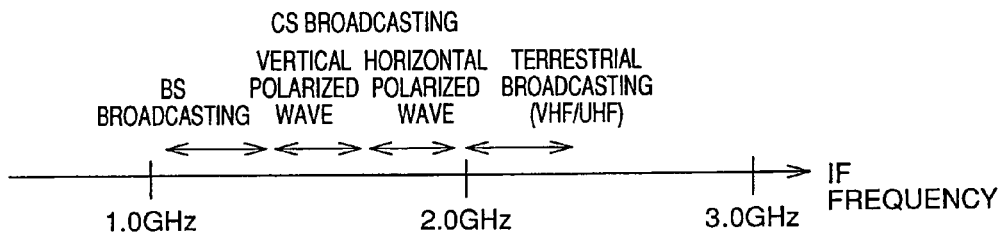

As shown in FIG. 3B, the frequency arranger 17 outputs signals obtained by frequency-converting the terrestrial broadcasting signal. A signal obtained by up-converting the terrestrial broadcasting signal of a low frequency to the 60 GHz band comes closer to local oscillated waves, which must not be emitted from an antenna but removed. Therefore, the terrestrial broadcasting signal is removed along with the local oscillated waves if up-converted as such. Thus, the frequency arranger 17 temporarily frequency-converts the terrestrial broadcasting wave to another frequency band (2 GHz band, for example) in the stage of the intermediate frequency.

Therefore, the terrestrial broadcasting signal having a low frequency can be readily separated from local oscillated waves when up-converted in the millimeter wave transmitter 100, whereby the terrestrial broadcasting signal can be received with no reduction of transmission quality also when VHF, UHF, BS and CS broadcasting waves are simultaneously processed.

Figure 3C:
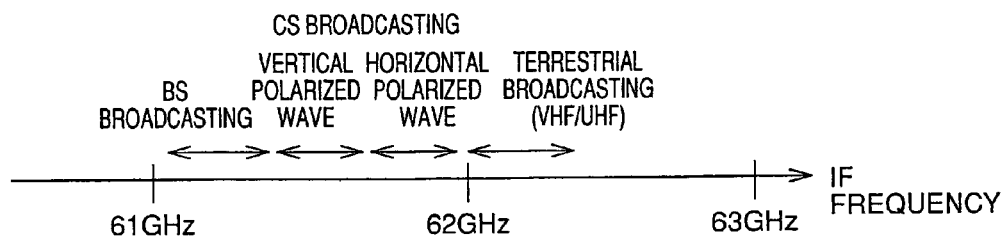

The up converter 18 provided in the millimeter wave transmitter 100 up-converts the broadcasting waves arranged on the frequency axis to the 60 GHz, and signals output from the up converter 18, having radio frequencies shown in FIG. 3C, are subjected to power amplification etc. in the transmitter 19 and output from the millimeter wave antenna 25 of the millimeter wave transmitter 100 as millimeter radio signals.

The millimeter wave signals are received in the millimeter wave antenna 27 of the millimeter wave receiver 200, amplified by the amplifier 28, down-converted by the down converter 29 and input in the inverse frequency arranger 30.

Figure 4:
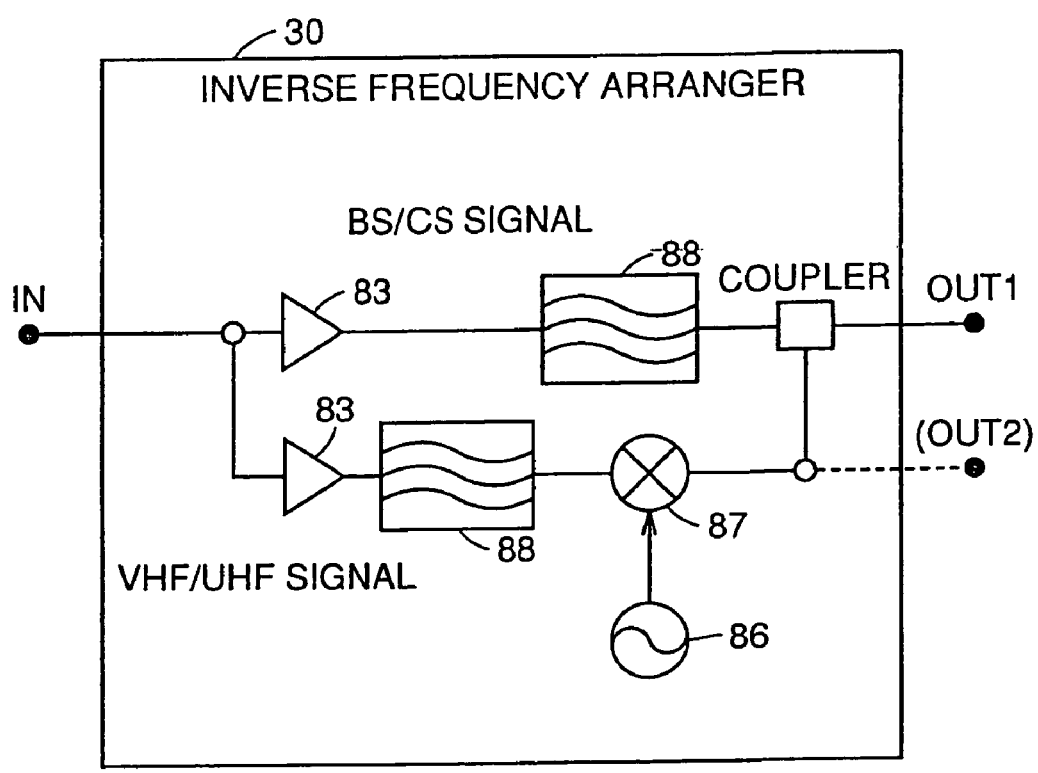
FIG. 4 illustrates the structure of an inverse frequency arranger 30.

Referring to FIG. 4, the inverse frequency arranger 30 has a function of converting the broadcasting waves from the intermediate frequencies arranged on the frequency axis to the original terrestrial frequencies through the mixer 87 and the local oscillator 86 in a process reverse to that of the frequency arranger 17.

Figure 3D:
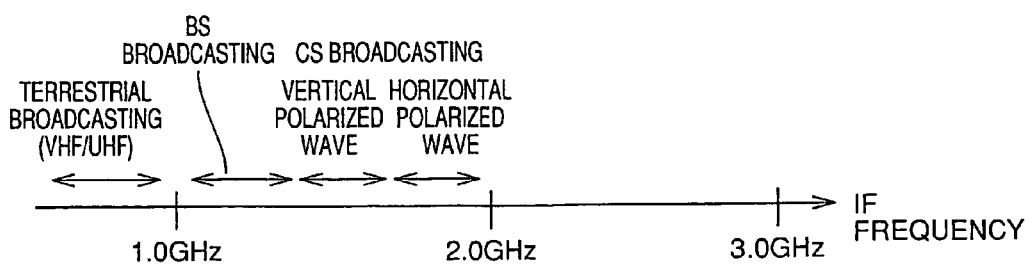

FIG. 3D illustrates the frequency arrangement of outputs from the inverse frequency arranger 30. The broadcasting waves obtained in the aforementioned manner are input in the electronic apparatus 300. Thus, TV receiving is enabled when the electronic apparatus 300 is a TV receiver.

The above is the basic structure for collectively transmitting broadcasting waves to the electronic apparatus 300 such as a TV receiver by the millimeter wave transmitter 100 and the millimeter wave receiver 200 through millimeter waves.

According to this structure, DC power supply paths and down-converted outputs are also connected by simply inserting and mounting the same into and on connectors of a TV receiver, BS and CS tuners and a VTR without employing wires such as coaxial cables indoors so that broadcasting waves can be transmitted in millimeter wave radio communication, whereby neither antenna work nor complicated wiring is required for setting additional TVs. Thus, a miniature TV, a personal computer provided with a TV tuner or a video camera can be freely used anywhere indoors or in the station yard.

A structure for controlling the millimeter wave receiver 200 and the millimeter wave transmitter 100 from the electronic apparatus 300 such as a TV receiver in FIGS. 1A and 1B.

The electronic apparatus 300 selects and receives the broadcasting waves supplied from the connector 40 in the broadcasting signal receiver 41. While the VHF/UHF antenna 11, the BS antenna 12 and the CS antenna 13 are directly connected to the connector 40 in the conventional receiving system employing no millimeter wave receiver, the connector 40 is connected to the connector 38 when employing the millimeter wave receiver 200.

Figure 5:
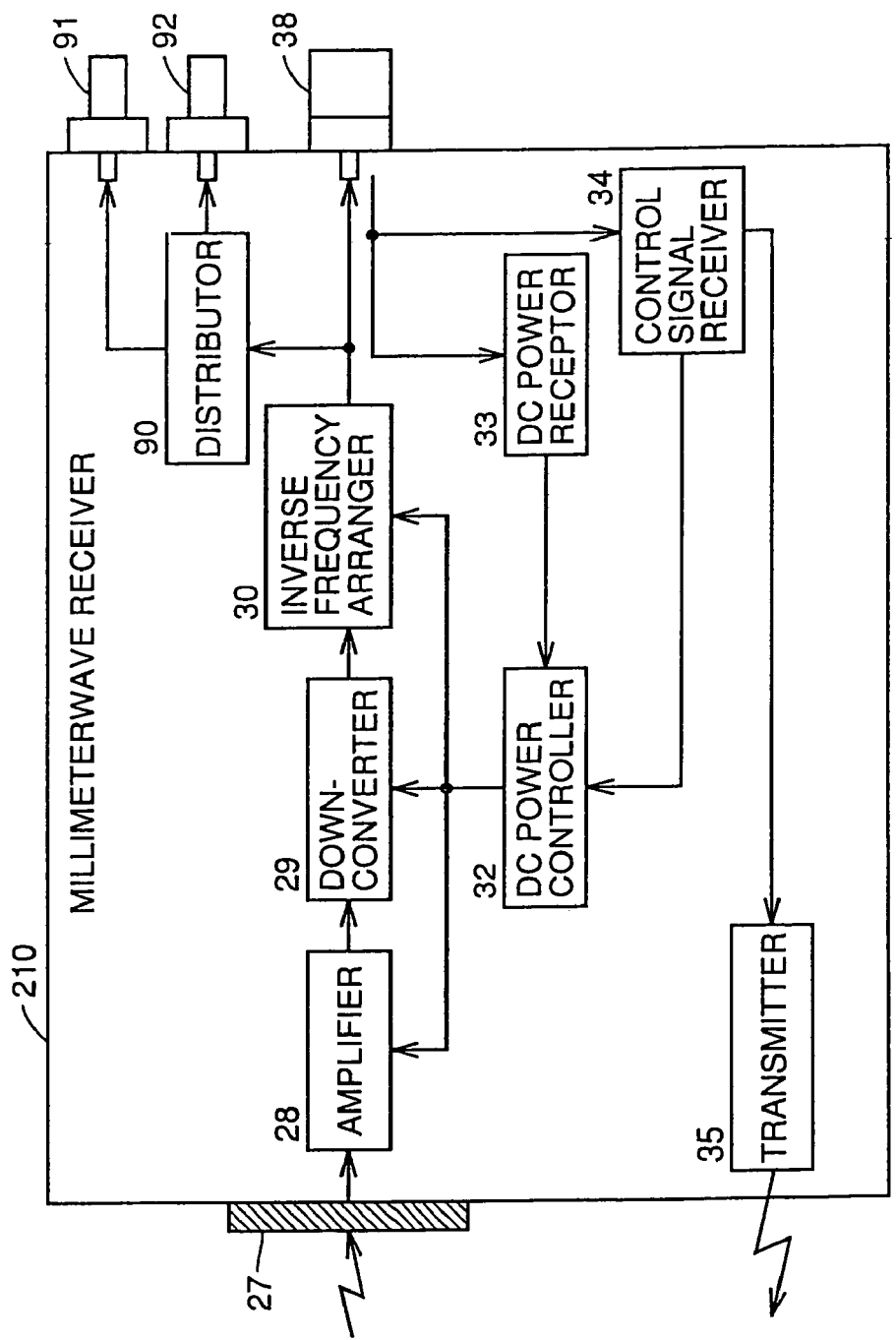
FIG. 5 is a block diagram showing the structure of a millimeter wave receiver 210 capable of outputting signals in distribution to a plurality of output connectors.

The electronic apparatus 300 may be provided with different connectors for terrestrial broadcasting and BS broadcasting. In this case, the millimeter wave receiver 200 may be replaced with a millimeter wave receiver 210 having a distributor 90 distributing outputs from an inverse frequency arranger 30 to a necessary number of outputs and outputting the same from output connectors 91 and 92, as shown in FIG. 5. When connecting the output connectors 91 and 92 with the electronic apparatus 300 through cables, the direction of the millimeter wave antenna 27 can be adjusted also in this case as described later by inserting the connector 38 into the electronic apparatus 300 and rotating the same.

Also when a TV receiver, a BS or CS tuner or a VTR has different connectors for terrestrial broadcasting, BS broadcasting etc., therefore, the connectors can be readily individually connected through a built-in distributor.

Referring again to FIG. 1B, the millimeter wave receiver 200 includes the mixer/switch 31 and the connectors 36 and 37, so that broadcasting waves from the VHF/UHF antenna 11, the BS antenna 12 and the CS antenna 13 can be utilized through the mixer/switch 31 by connecting these antennas 11 to 13 to the connector 36 or 37 also when the millimeter wave receiver 200 is mounted on the electronic apparatus 300. When using the millimeter wave receiver 200, the connectors 36 and 37 may not be connected in general. When the millimeter wave transmitter 100 transmits only VHF, UHF and BS broadcasting and CS broadcasting is to be distributed through a coaxial cable in another system or operations of the millimeter wave transmitter 100 and the millimeter wave receiver 200 are to be stopped, for example, the VHF/UHF antenna 11, the BS antenna 12, the CS antenna 13 etc. can be connected while keeping the millimeter wave receiver 200 mounted on the electronic apparatus 300.

Thus, it is possible to directly receive broadcasting waves obtained from an antenna wire such as a coaxial cable connected with an existing VHF, UHF, BS or CS antenna as well as to receive up-converted broadcasting waves from the millimeter wave transmitter 100, whereby both of a conventional antenna wire and a millimeter wave path can be readily selected in response to the user's convenience.

In order to select an arbitrary channel with the broadcasting signal receiver 41 in the electronic apparatus 300, the user previously stores information as to whether the receiving channel is directly input from the VHF/UHF antenna 11, the BS antenna 12 or the CS antenna 13 or input through the millimeter wave transmitter 100 and the millimeter wave receiver 200 in the memory 44 in association with the receiving channel. When the receiving channel selected on the basis of the information stored in the memory 44 utilizes the millimeter wave transmitter 100 and the millimeter wave receiver 200, the DC power supply 43 supplies DC power necessary for operations of the millimeter wave receiver 200 through the connector 40. The DC power is supplied in superposition with the broadcasting waves. Alternatively, the DC power supply 43 may supply DC power when the electronic apparatus 300 is turned on for superposing a control signal from the control signal transmitter 42 and performing DC power control of the DC power controller 32 at need.

At this time, the DC power receptor 33 and the control signal receiver 34 separate the DC power and the control signal passing through the connector 38 from the broadcasting waves respectively and supply the same to the DC power controller 32. In general, the DC power supply 43 supplies DC power when the electronic apparatus 300 requires a receiving operation, in order to properly save power consumption.

Thus, when the electronic apparatus 300 such as a TV receiver, a BS or CS tuner or a VTR provided with the millimeter wave receiver 200 requires no millimeter wave receiver in a power-off state, for example, it is possible to cut off supply of DC power to portions of the millimeter wave receiver 200 requiring no DC power supply by the control signal from the electronic apparatus 300 for preventing wasteful power consumption without requiring the user to intentionally control supply of DC power.

The DC power controller 32, controlling supply of DC power to the amplifier 28, the down converter 29 and the inverse frequency arranger 30, may also control a further block requiring DC power control.

While DC power can be supplied from the electronic apparatus 300 through the connector 38 in this embodiment, the electronic apparatus 300 is not necessarily adaptive to supply of DC power to the millimeter wave receiver 200. Therefore, a DC power adapter for the millimeter wave receiver 200 may be employed independently of the electronic apparatus 300, or the millimeter wave receiver 200 itself may store a power supply receiving power from an AC power supply.

Transfer of Control Information in Millimeter Wave Communication System

When the electronic apparatus 300 is a CS tuner or a TV receiver capable of receiving CS broadcasting, the control signal transmitter 42 can transmit information specifying whether receiving channel uses vertical polarization or horizontal polarization to the CS antenna 13, in addition to DC power control. When receiving BS broadcasting, the control signal transmitter 42 transmits information as to whether or not to supply DC power to the BS antenna 12. The information as to vertical polarization or horizontal polarization and whether or not to receive BS broadcasting is generated by the control signal transmitter 42, transmitted through the connectors 40 and 38 and separated by the control signal receiver 34. The transmitter 35 transmits the separated information to the millimeter wave transmitter 100. The signals, generally transmitted from the transmitter 35 to the receiver 22 through infrared radiation, may alternatively be transmitted through radio, wire, audio or power transmission.

Particularly when employing radio waves of the UHF band capable of passing through a shield such as a door or a wall dissimilarly to infrared radiation, the millimeter wave transmitter 100 and the millimeter wave receiver 200 can be used between partitioned rooms. Further, not only the signals for horizontal or vertical polarization control but also data can be transmitted by assembling a cordless telephone of PHS (personal handy phone system) or the like, for advantageously enabling bidirectional communication.

An exemplary structure of a millimeter wave receiver 220 capable of receiving external signals is now described.

Figure 6:
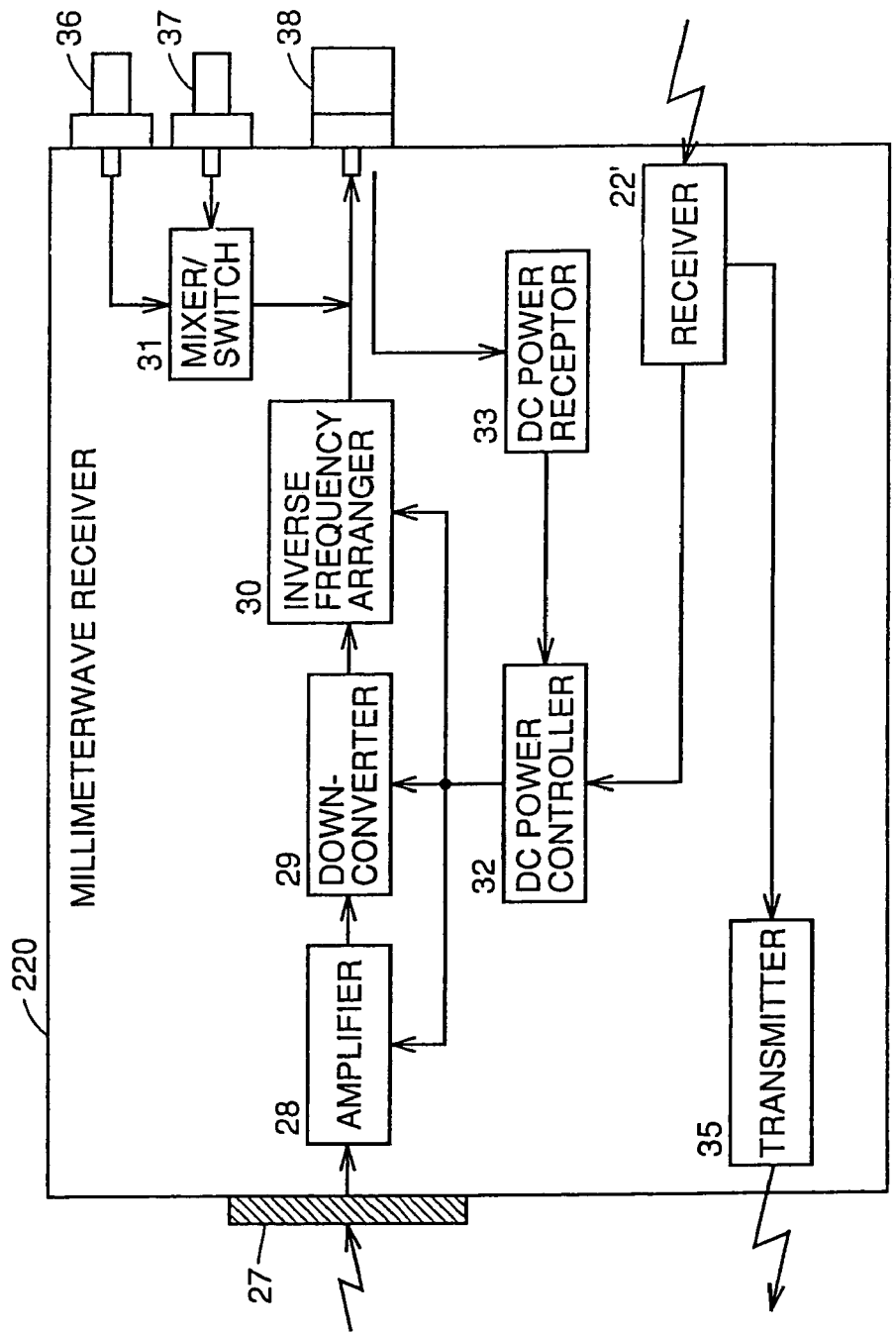
FIG. 6 is a block diagram showing the structure of a millimeter wave receive 220 capable of receiving external signals.

Referring to FIG. 6, the millimeter wave receiver 220 capable of receiving external signals is different from the millimeter wave receiver 200 shown in FIG. 1B in a point that the same includes a receiver 22' capable of directly receiving external signals in place of the control signal receiver 34 receiving signals through the connector 38. The remaining structure of the millimeter wave receiver 220 is similar to that of the millimeter wave receiver 200, and hence redundant description is not repeated.

A DC power controller 32 can turn on/off a DC power supply for the millimeter wave receiver 220 in response to an off state or selection of a channel for BS or CS broadcasting by receiving a control signal from a remote control transmitter attached to the electronic apparatus 300 such as a TV receiver. Further, it is possible to control the DC power controller 23 of the millimeter wave transmitter 100 or control the DC power supplies 20 and 21 on the basis of information on horizontal or vertical polarization similarly to the above by transmitting the control signal received in a receiver 22' to the millimeter wave transmitter 100 from a transmitter 35.

Figure 17:
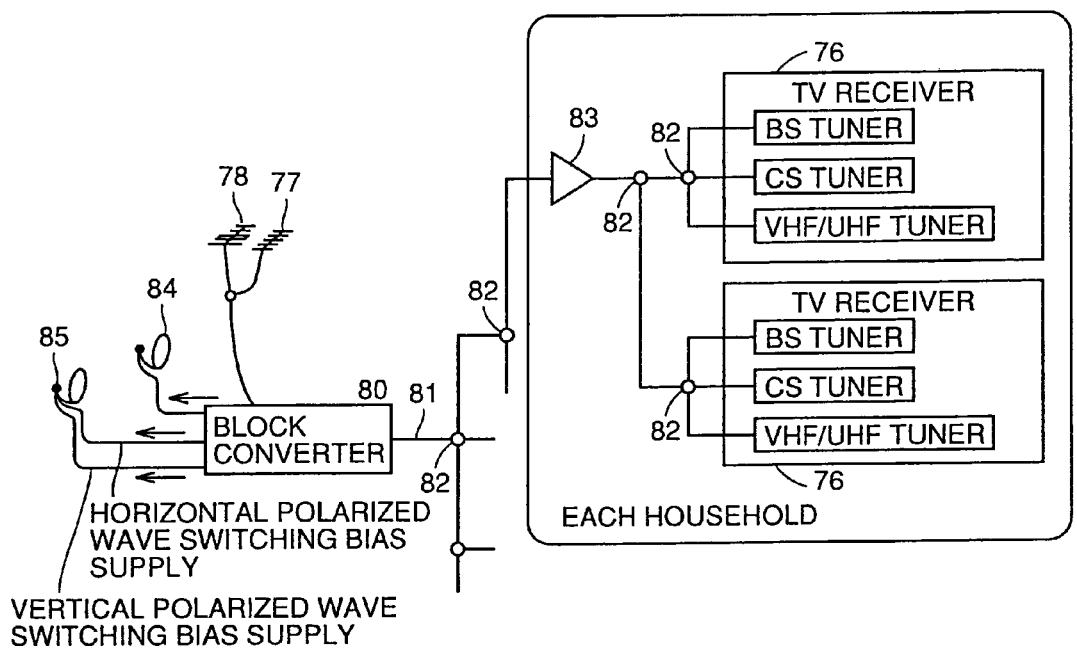
FIG. 17 illustrates a conventional TV broadcasting receiving system 900 in a condominium.

Referring again to FIG. 1A, the receiver 22 provided on the millimeter wave transmitter 100 receives the information from the millimeter wave receiver 200 or 220 and controls the DC power supply 20 for supplying DC power of 11 [V] for vertical polarization or DC power of 15 [V] for horizontal polarization to the CS antenna 13. When receiving BS broadcasting information, the receiver 22 controls the DC power supply 21 to supply DC power of 15 V to the BS antenna 12 through the connector 14. When synergically receiving CS broadcasting, the block converter 80 must be set between the connector 15 and the CS antenna 13, as shown in FIG. 17.

When the electronic apparatus 300 is off and requires no receiving, it is necessary to cut off supply of DC power to circuit blocks such as the amplifier 28, the down converter 29, the inverse frequency arranger 30 etc. requiring no operations in the millimeter wave receiver 200 and control supply of DC power to circuit blocks such as the broadcasting signal input 16, the frequency arranger 17, the up converter 18, the transmitter 19 etc. requiring no operations in the millimeter wave transmitter 100.

At this time, such a case is supposable that a plurality of millimeter wave receivers and a plurality of electronic apparatuses 300 receive transmission outputs from a single millimeter wave transmitter 100 in combination such that the electronic apparatuses 300 include a large-sized fixed TV receiver and a movable liquid crystal TV receiver mounted with the millimeter wave receivers 200 respectively, for example.

In this case, therefore, each of the electronic apparatus 300 which is the large-sized fixed TV receiver and the electronic apparatus 300 which is the movable liquid crystal TV receiver transmits apparatus identification information and information indicating that the apparatus 300 is in an ON state, for example, requiring receiving at present to the millimeter wave receiver connected with each apparatus 300. The control signal receiver 34 separates the transmitted information and the transmitter 35 transmits the information to the single millimeter wave transmitter 100.

The millimeter wave transmitter 100 receives the information in the receiver 22 and transmits the same to the memory 24. The memory 24, storing information on the apparatus using the broadcasting waves from the millimeter wave transmitter 100 previously input by the user, obtains the apparatus identification information and the information indicating that the apparatus 300 requires receiving at present from the receiver 22. If all apparatuses stored in the memory 24 are off to require no broadcasting waves, the DC power controller 23 cuts off supply of DC power to the broadcasting signal input 16, the frequency arranger 17, the up converter 18, the transmitter 19 etc. while the DC power supplies 20 and 21 cut off supply of DC power to the CS antenna 13, the BS antenna 12 etc. Thus, when millimeter wave transmission is unnecessary, power consumption can be saved with no intentional operation of the user.

When a TV receiver and a VTR provided with millimeter wave receivers respectively receive millimeter wave transmission from the single millimeter wave transmitter 100 while the VTR currently records a competing program on a different channel, the control signal transmitter 42 of the VTR forming the electronic apparatus 300 transmits information indicating that the VTR currently records the competing program to the control signal receiver 34 through the connectors 40 and 38. The control signal receiver 34 further transmits this information to the millimeter wave transmitter 100 through the transmitter 35, and the receiver 22 of the millimeter wave transmitter 100 receives this information. Even if the TV receiver transmits information indicating that the same requires no distribution of broadcasting to the millimeter wave transmitter 100 at this time, the DC power controller 23 of the millimeter wave transmitter 100 continuously supplies DC power to the broadcasting signal input 16, the frequency arranger 17, the up converter 18 and the transmitter 19. Also when the broadcasting channel subjected to millimeter wave transmission is switched at any time by a request from the electronic apparatus 300, such switching of the broadcasting channel subjected to transmission is inhibited so that the VTR normally records the competing program if the information indicating that the VTR currently records the competing program reaches the millimeter wave transmitter 100. If not for this function, it follows that the broadcasting channel stops during recording of the competing program in the VTR.

The receiver 22 in the millimeter wave transmitter 100 may not only receive signals from the transmitter 35 in the millimeter wave receiver 200 but also directly receive a remote control signal from a remote control transmitter attached to the electronic apparatus 300, for example. When the remote control transmitter attached to the electronic apparatus 300 transmits a TV-on signal or a channel switch signal, the electronic apparatus 300 receives this remote control signal and operates while the receiver 22 can also receive the remote control signal for controlling the DC power supplies 20 and 21 and supplying DC power to the CS antenna 13 and the BS antenna 12. Alternatively, the DC power controller 23 can be controlled in response to supply of DC power to the electronic apparatus requiring the millimeter wave transmitter 100 through the memory 24 to supply DC power to the broadcasting signal input 16, the frequency arranger 17, the up converter 18, the transmitter 19 etc. When the TV receiver or the VTR transmits a power-off signal, the millimeter wave transmitter 100 can be turned off. It is also possible to switch the broadcasting channel transmitted through the millimeter wave transmitter 100 from that for BS broadcasting to that for BS broadcasting. In this case, the remote control transmitter attached to the electronic apparatus 300 or that prepared for the millimeter wave transmitter 100 or the millimeter wave receiver 200 or 220 can be utilized.

Thus, the BS and CS antennas can be supplied with DC power in response to the busy condition of the millimeter wave transmission/receiving system, whereby no DC power for the antennas may be relayed from a TV receiver or a VTR for BS broadcasting or a CS tuner.

When the number of channels to be transmitted is increased for the millimeter wave transmission band, information for limiting the operation of millimeter wave transmission/receiving to only transmission of a CS channel, for example, is introduced into the control signal from the electronic apparatus 300 such as a TV receiver, a BS or CS tuner or a VTR provided with the millimeter wave receiver 200, and transmitted to the millimeter wave receiver 200 and the millimeter wave transmitter 100. Thus, the millimeter wave transmitter 100 limits the signal to the necessary band by the broadcasting signal input 16 and thereafter up-converts the same in the up converter 18 in response to the channel band required by the electronic apparatus 300. In this case, the channel band can be switched at need also when the number of the channels to be transmitted is excessively increased, and the number of transmitted channels can be sufficiently ensured.

Antenna Structure of Millimeter Wave Receiver

Methods of mounting the inventive millimeter wave receiver on the electronic apparatus are now described. Each of FIGS. 7, 8 and 9 shows the antenna structure of a millimeter wave receiver capable of transmitting DC power and a control signal in superposition through the aforementioned connector 38 and a structure of mounting this antenna on a TV receiver 45, which is a representative example of the electronic apparatus 300.

Figure 7:
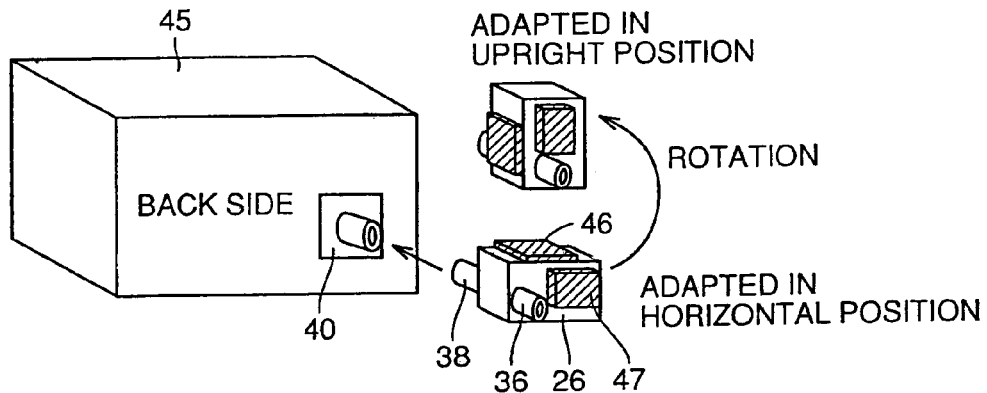
FIG. 7 illustrates a first exemplary method of mounting the inventive millimeter wave receiver on a TV receiver.
Figure 8:
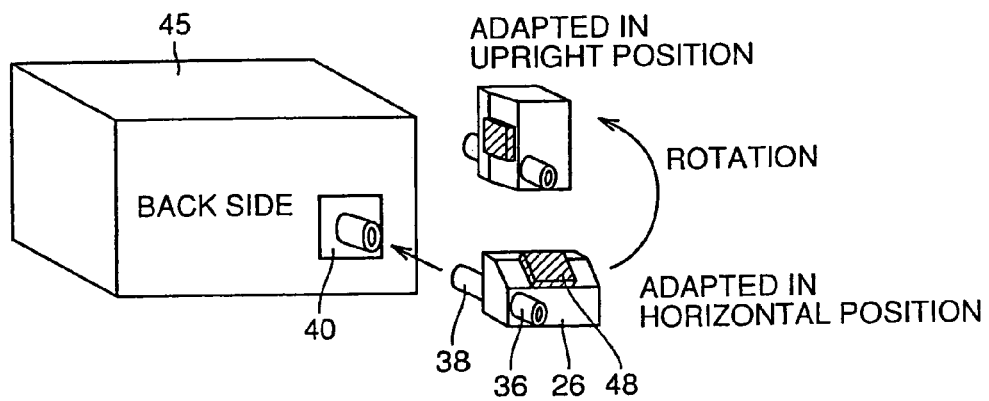
FIG. 8 illustrates a second exemplary method of mounting the inventive millimeter wave receiver on a TV receiver.
Figure 9:
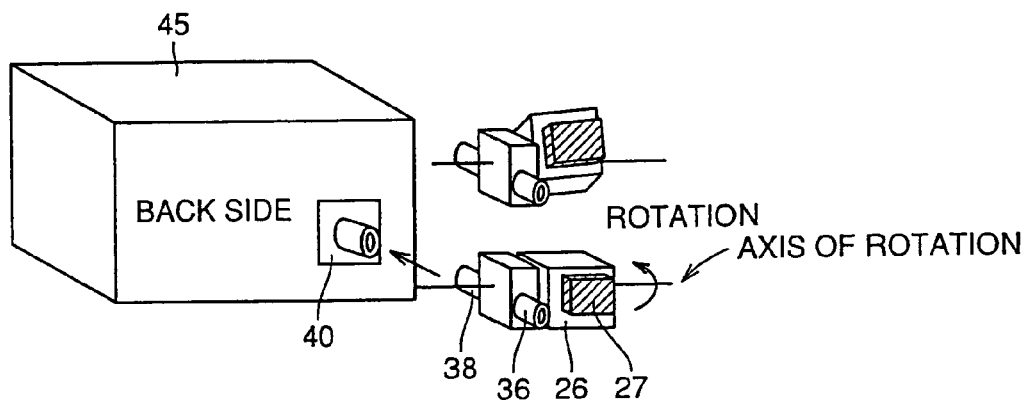
FIG. 9 illustrates a third exemplary method of mounting the inventive millimeter wave receiver on a TV receiver.

While a plurality of exemplary structures of the millimeter wave receiver are described in relation to this embodiment and any structure is applicable to the millimeter wave receivers shown in FIGS. 7, 8 and 9, each of FIGS. 7 to 9 representatively shows the millimeter wave receiver 200.

Millimeter waves of the 60 GHz band allowing a wide band and having a proper transmission attenuation property also have proper transmission directivity. While no information leaks to the periphery when transmission directivity is extremely narrow, optical axis and the directivity must be adjusted not to deviate between antennas in the case of light. When the transmission directivity is extremely wide, information may leak to the periphery or transmission outputs and receiving sensitivity must be increased although no problem arises in antenna directions. The millimeter waves have intermediate characteristics, and the direction of the millimeter wave antenna 27 is preferably controllable to some extent in the millimeter wave receiver 200.

When the connector 38 of the millimeter wave receiver 200 is inserted in a connector 40 of the TV receiver 45 as shown in FIG. 7, 8 or 9, the body of the millimeter wave receiver 200 can be rotated about the connector 40.

Referring to FIG. 7, an antenna 46 serving as the millimeter wave antenna 27 is mounted on the millimeter wave receiver 200 in a direction parallel to the axis of rotation thereof so that the direction of the surface of the antenna 46 is changeable when rotating the millimeter wave receiver 200 about the connector 40. Thus, when mounting the millimeter wave receiver 200 on the TV receiver 46, the direction of the antenna 46 can be readily changed in a direction most increasing the receiving sensitivity.

When mounting another antenna 47 serving as the millimeter wave antenna 27 perpendicularly to the axis of rotation, the receiving sensitivity of the antenna 47 remains unchanged on whatever rotation position the millimeter wave receiver 26 is mounted. Thus, this is effective if the receiving level in the direction of the antenna 47 is strong.

Referring to FIG. 8, an antenna 48 is set at an oblique angle with respect to the axis of rotation about the connector 40. This antenna 48 has a component adjustable in response to the rotation angle in mounting and an unchanged component. Therefore, this is an effective method when providing only one millimeter wave antenna 27.

Referring to FIG. 9, the millimeter wave receiver 200 has an axis of rotation in a direction perpendicular to the axis of rotation about the connectors 40 and 38, and the millimeter wave antenna 27 is rotatably mounted about the same. Therefore, the millimeter wave antenna 27 can be freely directed in a space. When employing a coaxial connector for the axis of rotation of the portions on which the connector 38 and the millimeter wave antenna 27 are mounted, the two portions can conveniently be separated.

According to this structure, the direction of the millimeter wave antenna of the millimeter wave receiver 200 can be arbitrarily changed in the space, whereby the antenna can be freely adjusted to a direction of a higher receiving level also when radio waves from the millimeter wave transmitter 100 or the antenna of the millimeter wave receiver 200 has directivity.

While the antennas 46, 47 and 48 have been described as plane antennas having a certain degree of directivity in the surface directions, an antenna having no directivity can also be effectively employed since the direction for mounting the millimeter wave receiver 200 may not be taken into consideration in this case. While the connector 40 has been described as a coaxial connector, a similar effect is expectable also when the connector 40 is not coaxial but rotatable or bendable on the portion of the connector 38. If coaxially setting the connectors 38 and 36 mounted on the millimeter wave receiver 200, the position of an antenna cable connected to the connector 36 remains unchanged when the millimeter wave receiver 200 is rotated with respect to the connector 40, and hence the antenna cable is not pulled or loosened.

While FIGS. 7, 8 and 9 show the methods of mounting the millimeter wave receiver 200 on the connector 40 of the existing TV receiver 45, the back surface of the TV receiver 45 will not protrude when previously depressing the portion of the TV receiver 45 for mounting the connector 40 and mounting the millimeter wave receiver 200 on this portion, whereby the connector 38 can be prevented from being broken by hitting the millimeter wave receiver 200 against a wall or the like also when moving the TV receiver 45 provided with the millimeter wave receiver 200. When covering the depressed portion, mounting of the millimeter wave receiver 200 is inconspicuous and breaking or dirt with dust or the like can be readily prevented. Particularly in a thin TV receiver such as a liquid crystal TV receiver, protrusion can be effectively eliminated also when mounting the millimeter wave receiver 200. The millimeter wave receiver 200 may alternatively be built into the TV receiver 45, as a matter of course.

Monitor for Millimeter Wave Transmission State

The structure of a millimeter wave receiver 230 capable of monitoring a millimeter wave transmission state is now described.

Figure 10:
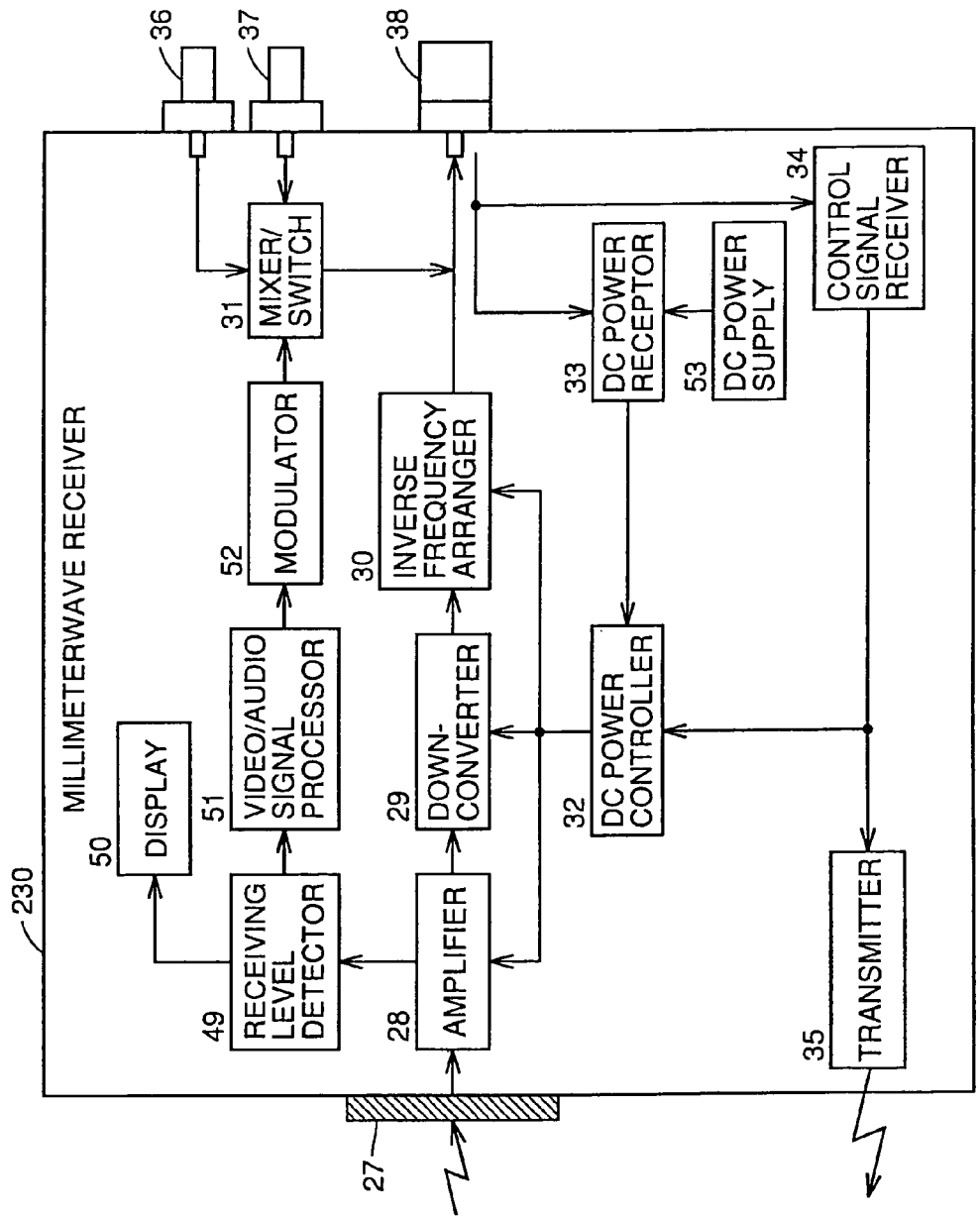
FIG. 10 is a block diagram showing the structure of a millimeter wave receiver 230 capable of monitoring a millimeter wave transmission state.

Referring to FIG. 10, the millimeter wave receiver 230 is different from the millimeter wave receiver 200 shown in FIG. 1B in a point that the same further includes a receiving level detector 49, a display 50, a video/audio signal processor 51, a modulator 52 and a DC power supply 53. The remaining structure of the millimeter wave receiver 230 is similar to that of the millimeter wave receiver 200, and hence redundant description is not repeated.

While the millimeter wave receiver 230 is mounted on the connector 40 of the TV receiver 45 through the connector 38 and the millimeter wave receiving level is maximized through the angle of rotation of the mounting as described above, receiving signals from the millimeter wave antenna 27 formed by the antenna 46, 47 or 48 are supplied to and amplified by an amplifier 28. These signals are supplied to a down converter 29 as well as to the receiving level detector 49. The receiving level detector 49 detects the receiving signals, converts the signals to DC voltages or digital signals responsive to the receiving level and supplies the same to the video/audio signal processor 51. The video/audio signal processor 51 produces video signals indicating the receiving situation such as those displaying the receiving level in a bar graph and audio signals changing the audio level in response to the receiving level in response to the DC voltages or the digital signals. The modulator 52 modulates the produced signals to RF signals of the VHF channel 1 or 2, for example. A mixer/switch 31 mixes the RF signals with outputs from an inverse frequency arranger 30 and outputs the mixed signals from a connector 38 to the electronic apparatus 300 such as a TV receiver. Thus, when adjusting the receiving level in the electronic apparatus 300 such as a TV receiver through the mounting direction of the millimeter wave receiver 230, the VHF channel 1 or 2 is received for displaying received images or outputting sounds so that the millimeter wave receiver 230 is mounted on the electronic apparatus 300 and a mounting direction having an excellent receiving level can be readily set on the basis of the images or sounds.

The receiving level in the millimeter wave receiver 230 can be displayed on a specific channel of the TV receiver in a bar graph or the sounds can be output in a volume of an audio frequency responsive to the receiving level, for example, whereby the direction of the antenna can be extremely readily adjusted.

When setting the millimeter wave transmitter 100, the millimeter wave receiver 230 and the electronic apparatus 300, it is supposable that the electronic apparatus 300 cannot correctly receive millimeter waves as the case may be. In particular, it is difficult to confirm whether or not millimeter waves are correctly transmitted from the millimeter wave transmitter 100 and correctly received by the millimeter wave receiver 230. In this case, the millimeter wave receiver 230 is disconnected from the electronic apparatus 300, independently operated with DC power supplied from a DC power supply 53 and brought to a portion close to the millimeter wave transmitter 100 set indoors in the vicinity of a ceiling, for example, so that the display 50 such as an LED (light emitting diode) or a liquid crystal display displays the receiving level in response to the output level of the receiving level detector 49. Therefore, the transmission outputs of millimeter waves can be readily confirmed from a portion around the millimeter wave transmitter 230, the LED or the like can display whether or not the millimeter waves are correctly delivered from the millimeter wave transmitter 100 and how high the radio level is, and radio propagation can be readily confirmed when setting the millimeter wave receiver 230. Thus, it is possible to readily verify whether or not the path up to the electronic apparatus 300 has any problem by following the transmission path. If it is confirmable that the transmission path has no problem, it follows that the millimeter wave receiver 230 may be connected to the connector 40 of the electronic apparatus 300 for making confirmation on the side of the electronic apparatus 300 this time.

Display of Operating State of Millimeter Wave Transmission System

The structures of a millimeter wave transmitter 110 and a millimeter wave receiver 240 capable of displaying the operating state of a millimeter wave transmission system are now described.

Figure 11:
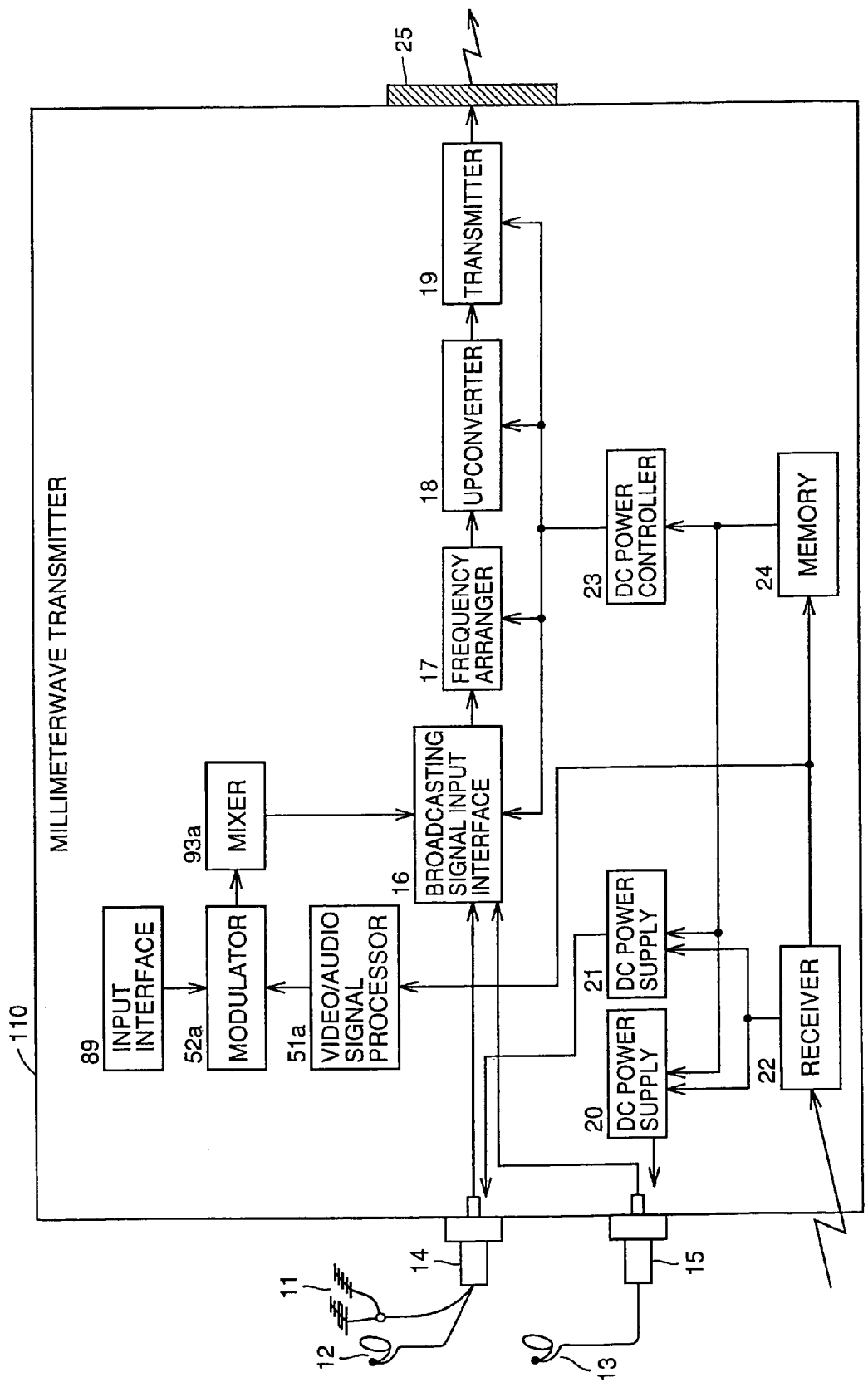
FIG. 11 is a block diagram showing the structure of a millimeter wave transmitter 110 capable of displaying an operating state of a millimeter wave transmission system.

Referring to FIG. 11, the millimeter wave transmitter 110 capable of displaying the operating state of the millimeter wave transmission system is different from the millimeter wave transmitter 100 shown in FIG. 1A in a point that the same further includes a video/audio signal processor 51*a*, a modulator 52*a*, a mixer 93*a* and an input interface 89. The remaining structure of the millimeter wave transmitter 110 is similar to that of the millimeter wave transmitter 100 and hence redundant description is not repeated.

In the millimeter wave transmitter 110, the video/audio signal processor 51*a* produces an information display screen expressible as an information channel, for example, or an audio signal on the basis of control information as to selection of BS broadcasting or CS broadcasting received from a receiver 22, information on results of collation with an apparatus stored in a memory 24 or information set for a frequency arranger 17 or an up converter 18.

FIG. 12 shows exemplary display of the information channel.

The modulator 52*a* modulates the produced signal to broadcasting waves of the VHF channel 1 or 2, and the mixer 93 superposes the signals on original broadcasting waves input from a connector 14 or 15. The superposed signals are transmitted to the millimeter wave receiver 240 and the electronic apparatus 300 in millimeter wave transmission similarly to the original broadcasting waves. When receiving the VHF channel 1 or 2 as an information channel, therefore, the electronic apparatus 300 such as a TV receiver can regularly confirm the operating state of the millimeter wave communication system including the millimeter wave transmitter 110.

Similarly to the information channel, it is possible to modulate a video signal and an audio signal of a movie or the like externally input through the input interface 89 by the modulator 52*a* to broadcasting waves of the VHF channel 1 or 2 and superpose the same on the original broadcasting waves input from the connector 14 or 15 by the mixer/switch 93*a*. In the electronic apparatus 300 such as a TV receiver, therefore, images and sounds of the movie or the like can be received anywhere in the house by receiving the VHF channel 1 or 2.

In order to utilize a millimeter wave transmitter and a millimeter wave receiver as a millimeter wave communication system, it is general to output broadcasting waves input through an antenna from the millimeter wave receiver without changing the broadcasting channel. In order to prevent crosstalk between the millimeter waves and general broadcasting waves or change the broadcasting channel for millimeter wave transmission to a specific channel plan, it is also possible to superpose TV preset information on an information channel of the millimeter wave transmitter as channel plan switching information and output the same so that channel preset information on the TV side can be automatically changed. When outputting switching of the channel plan itself as screen information of the information channel, this is easily understandable and convenient for the user. Thus, it follows that a channel plan necessary for transmission may be transmitted regardless of the receiving channel preset state of the millimeter wave transmitter 110 or the electronic apparatus 300.

Figure 13:
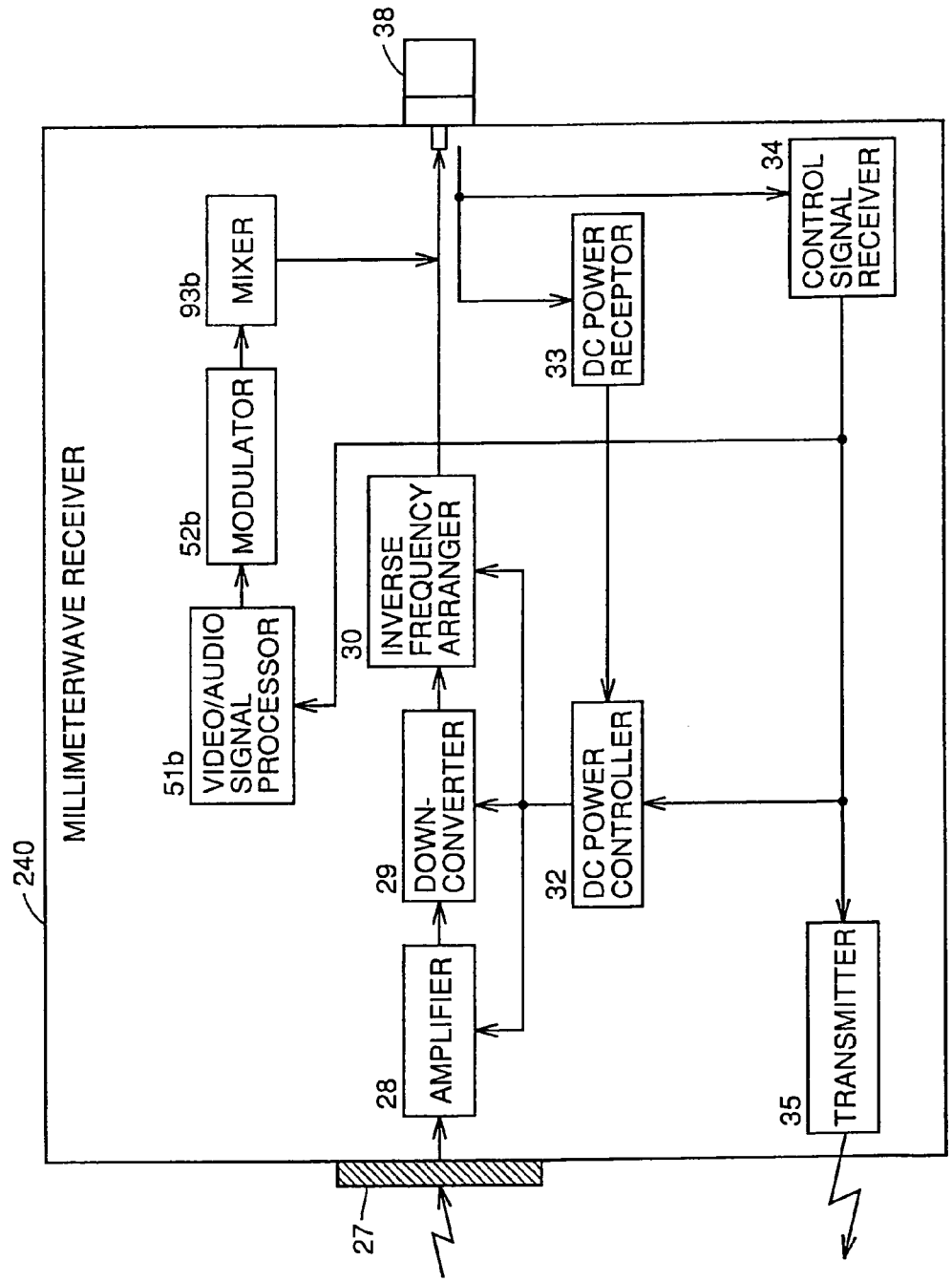
FIG. 13 is a block diagram showing the structure of a millimeter wave receiver 240 capable of displaying the operating state of the millimeter wave transmission system.

Referring to FIG. 13, the millimeter wave receiver 240 capable of displaying the operating state of the millimeter wave transmission system can superpose an information screen or sounds based on internal information on broadcasting signals. The millimeter wave receiver 240 is different from the millimeter wave receiver 200 shown in FIG. 1B in a point that the same further includes a video/audio signal processor 51*b*, a modulator 52*b* and a mixer 93*b*.

In the millimeter wave receiver 240, the video/audio signal processor 51*b* produces a video signal for displaying information obtained by a control signal receiver 34 from the electronic apparatus 300 or set information of a down converter 29 or an inverse frequency arranger 30 on the TV receiver or outputting sounds on the basis of the information or the set information. This information indicates that the millimeter wave receiver 240 selectively transmits only a channel for CS broadcasting, for example. The modulator 52*b* modulates the processed video signal and an audio signal to NTSC TV signals or the like. In general, the mixer/switch 93*b* mixes the TV signals as signal of the VHF channel 1 or 2 with outputs of the inverse frequency arranger 30, and supplies the mixed signals to the electronic apparatus 300 through a connector 38. When receiving the VHF channel 1 or 2 in the TV receiver forming the electronic apparatus 300, the user can confirm that the broadcasting channel transmitted through the millimeter wave receiver 240 is only that for CS broadcasting, for example, on the TV screen.

Second Embodiment

Figure 14B:
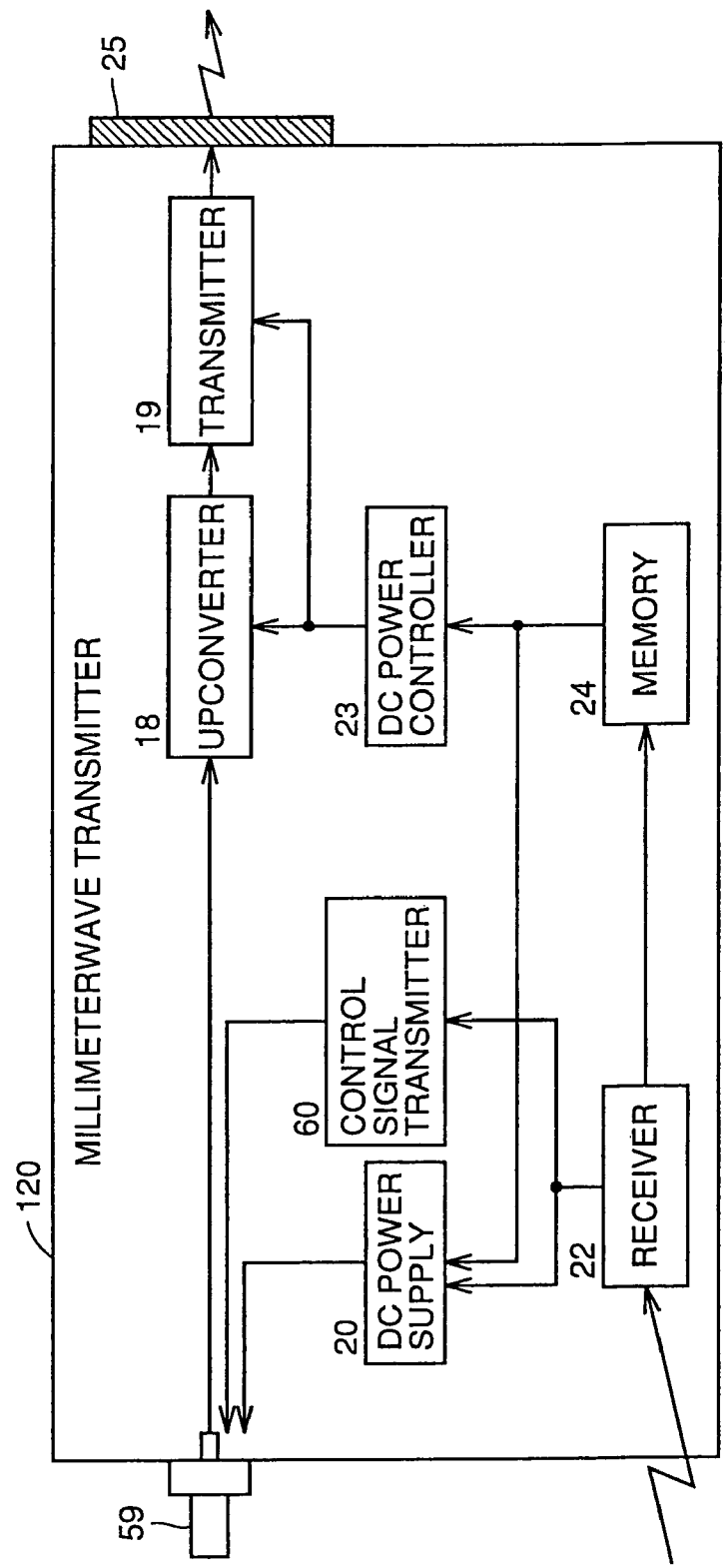

FIGS. 14A and 14B are block diagrams showing the structure of a millimeter wave transmission system 2000 having a repeater 500 according to a second embodiment of the present invention.

FIG. 14A shows the structure of the repeater 500 included in the millimeter wave transmission system 2000. FIG. 14B shows the structure of a millimeter wave transmitter 120 included in the millimeter wave transmission system 2000. The millimeter wave transmitter 120, employed in combination with the repeater 500, has a structure corresponding to the repeater 500.

The structures of a millimeter wave receiver and an electronic apparatus corresponding to the millimeter wave transmission system 2000 are identical to those described with reference to the first embodiment and hence redundant description is not repeated. In other words, the millimeter wave communication system shown in the first embodiment can be formed by combining any of the millimeter wave receivers 200 to 240 and the electronic apparatus 300 described above with the millimeter wave transmission system 2000 according to the second embodiment.

Referring to FIG. 14A, the repeater 500 includes a connector 14, another connector 15, a broadcasting signal input 16, a frequency arranger 17, a DC power supply 20 another DC power supply 21, a DC power controller 23, a DC power receptor 56, a control signal receiver 57 and a connector 58.

Referring to FIG. 14B, the millimeter wave transmitter 120 includes an up converter 18, a transmitter 19, a DC power supply 20, a receiver 22, a DC power controller 23, a memory 24, a millimeter wave antenna 25, a connector 59 and a control signal transmitter 60.

The repeater 500 is generally set on the roof of a house in the vicinity of positions where a VHF/UHF antenna 11, a BS antenna 12 and a CS antenna 13 are set, and coaxial cables from the VHF/UHF antenna 11, the BS antenna 12 and the CS antenna 13 are bundled and connected to the indoor millimeter wave transmitter 120 through a single coaxial cable from the connector 58.

Receiving signals from the VHF/UHF antenna 11, the BS antenna 12 and the CS antenna 13 are input in the broadcasting signal input 16 through the connectors 14 and 15 respectively. The input broadcasting waves are supplied to the frequency arranger 17, which in turn arranges the broadcasting waves of the VHF/UHF band on a high frequency band. Outputs from the frequency arranger 17 are supplied to the millimeter wave transmitter 120 through the connectors 58 and 59. The radio waves of current frequency arrangement, which is shown in FIG. 3B, can be up-converted by the up converter 18 in the millimeter wave transmitter 120 as such, and can be transmitted indoors through the transmitter 19 and the millimeter wave antenna 25.

Thus, the VHF/UHF antenna 11, the BS antenna 12 and the CS antenna 13 can be connected to the millimeter wave transmitter 120 through a single coaxial cable when connected to the repeater 500, and the broadcasting waves can be up-converted and transmitted as such on the side of the millimeter wave transmitter 120 since frequency arrangement has already been completed on the side of the repeater 500.

At this time, the millimeter wave transmitter 120 supplies DC power for the repeater 500 from the DC power supply 20 to the connector 59 in response to a control signal from the millimeter wave receiver obtained from the receiver 22 while transmitting necessary control signals to the repeater 500 through the control signal transmitter 60. In this case, the control signals include a signal for controlling the DC power for the repeater 500 itself and a control signal for selectively supplying DC power to the BS antenna 12 and the CS antenna 13.

The repeater 500 receives these superposed signals and the DC power from the connector 58 in the control signal receiver 57 and the DC power receptor 56 respectively, and the control signal receiver 57 controls the DC power supplies 20 and 21 in response to the control signals for controlling supply of DC power to the CS antenna 13 and the BS antenna 12. When all apparatuses stored in the memory 24 require no receiving, the DC power controller 23 can cut off DC power to unnecessary blocks such as the broadcasting signal input 16 and the frequency arranger 17.

While the repeater 500 up-converts the signals from the VHF/UHF antenna 11, the BS antenna 12 and the CS antenna 13 set on the roof of the house to millimeter waves and connects the same to the indoor millimeter wave transmitter 120 through a single coaxial cable in the second embodiment, the millimeter wave transmitter 100 shown in FIG. 1 itself may be set on the roof of the house for directly transmitting millimeter waves from the millimeter wave antenna 25 to the millimeter wave receiver 120 set indoors.

When employing such a setting method, no coaxial cable may be wired indoors from the roof. While it is difficult to transmit millimeter waves indoors from above the roof through roofing tiles, the millimeter waves can readily pass through a skylight or the like provided on the roof for readily implementing wireless transmission indoors. When providing the millimeter wave transmitter on the roof, power of a solar battery or the like may be utilized so that no DC power cable may be wired in addition to the coaxial cable. Thus, it is also possible to transmit broadcasting waves from various antennas indoors in a completely wireless manner.

Third Embodiment

Figure 15:
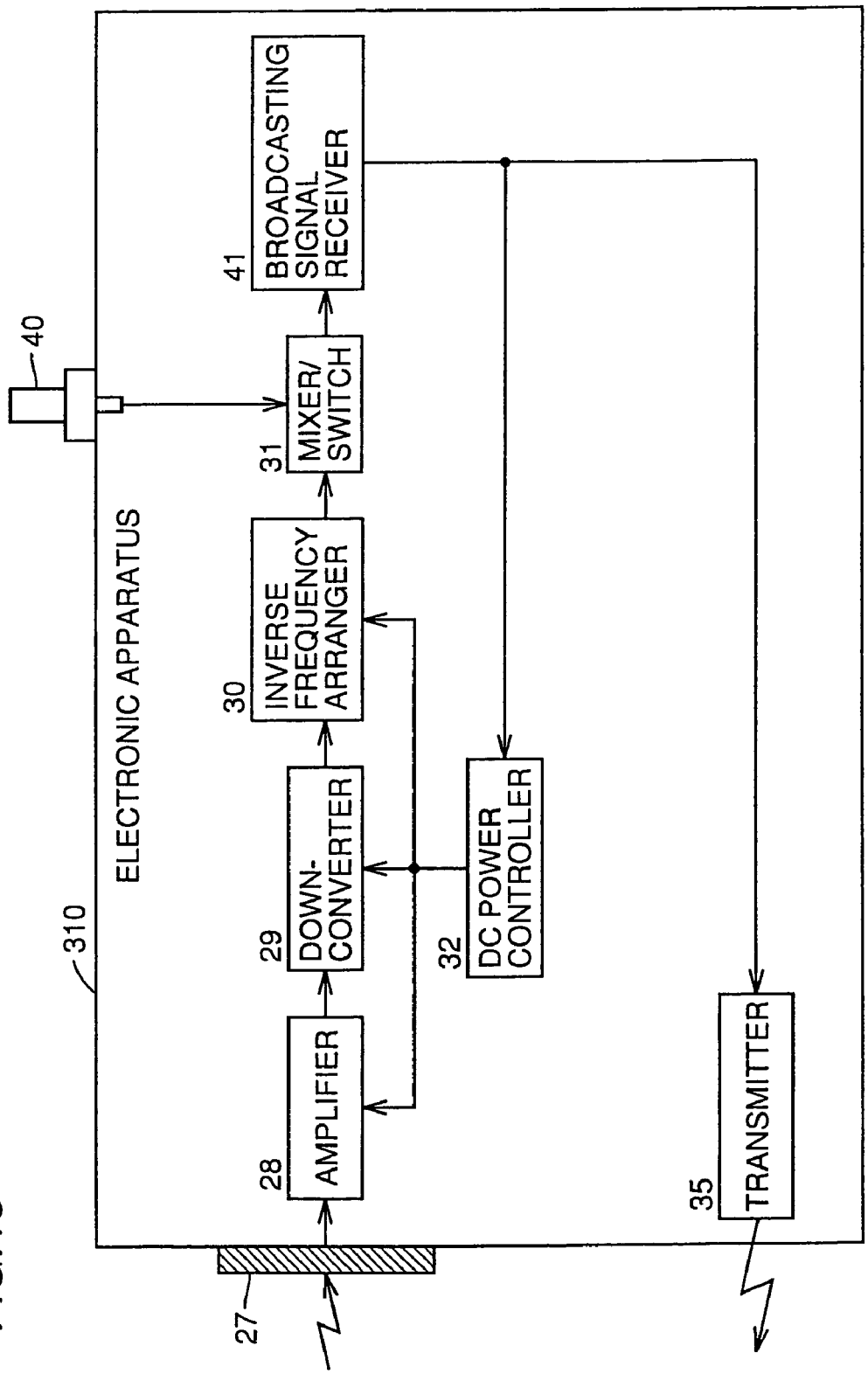
FIG. 15 is a block diagram showing the structure of an electronic apparatus 310 having a millimeter wave receiving function according to a third embodiment of the present invention.
Figure 16:
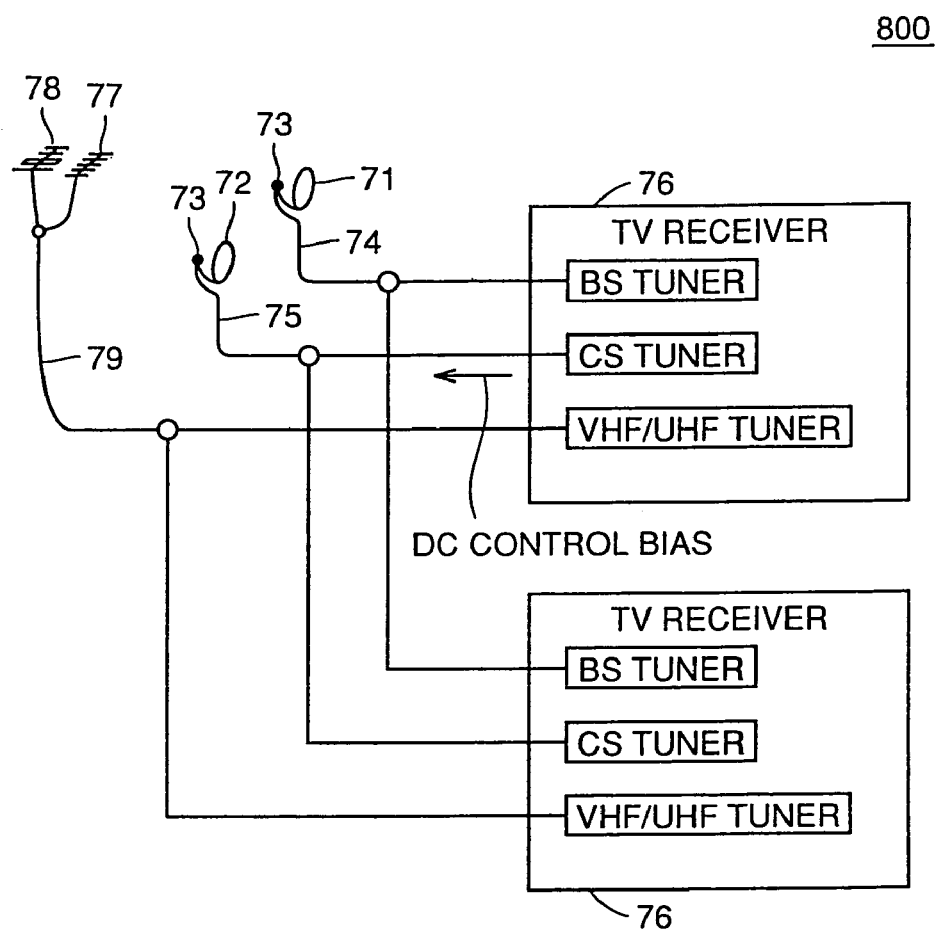
FIG. 16 illustrates a conventional TV broadcasting receiving system 800 in a personal residence.

FIG. 15 is a block diagram showing the structure of an electronic apparatus 310 having a millimeter wave receiving function according to a third embodiment of the present invention.

Referring to FIG. 15, the electronic apparatus 310 includes a millimeter wave antenna 27, an amplifier 28, a down converter 29, an inverse frequency arranger 30, a mixer/switch 31, a DC power controller 32, a transmitter 35, a connector 40 and a broadcasting signal receiver 41.

Signals from general antennas for terrestrial broadcasting, BS broadcasting and CS broadcasting are input from the connector 40, so that the electronic apparatus 310 storing a millimeter wave receiver is connected to the general antennas without through the millimeter wave receiver. Millimeter waves transmitted from the millimeter wave transmitter are received by the millimeter wave antenna 27 and amplified by the amplifier 28. The amplified receiving signals are down-converted by the down converter 29 and finally converted to the original broadcasting frequency band by the inverse frequency arranger 30. The converted signals and the signals input from the connector 40 are mixed or switched/selected in the mixer/switch 31, so that either signals are supplied to the broadcasting signal receiver 41 in response to the condition of the user.

When the electronic apparatus 310 is turned on or a channel for using the millimeter wave transmitter/receiver is selected in response to which channel the user transmits through the millimeter wave transmitter/receiver, the broadcasting signal receiver 41 turns on the DC power controller 32 for supplying DC power to blocks such as the amplifier 28, the down converter 29 and the inverse frequency arranger 30 necessary for millimeter wave receiving. At this time, the broadcasting signal receiver 41 transmits information on application of DC power, information on which broadcasting channel is transmitted etc. to the millimeter wave transmitter through the transmitter 35, for transmitting broadcasting waves of the necessary band.

Thus, it is possible to switch the broadcasting channel subjected to millimeter wave transmission from that for BS broadcasting to that for CS broadcasting or cut off the DC power for the millimeter wave transmitter with a control signal from the millimeter wave receiver or a signal from a remote control transmitter of a TV receiver. When two TV receivers or VTRs utilize the outputs from the millimeter wave receiver and the two TV receivers or VTRs are in OFF states, the millimeter wave transmitter receiving information indicating this state can automatically cut off supply of DC power to unnecessary transmission parts. Thus, wasteful power consumption in the millimeter wave transmitter can be prevented with no intentional operation of the user.

The millimeter wave transmitter, which is connected to a connector provided in a living room or the like for up-converting broadcasting waves obtained from the connectors to millimeter waves and radiating the millimeter waves indoors, may be mounted on or stored in the electronic apparatus represented by the TV receiver 45. In other words, a connector set on a wall and the TV receiver 45 are connected with each other by a conventional coaxial cable or the like for radiating millimeter waves from the millimeter wave transmitter mounted on or stored in the TV receiver 45 to another indoor TV receiver. In this case, wireless transmission to another indoor TV receiver such as a liquid crystal TV is enabled although the TV receiver 45 itself does not receive the broadcasting waves in a wireless manner. A general house has an existing TV receiver and generally requires no intentional change of this portion. Therefore, it is extremely effective that an antenna for a newly purchased liquid crystal TV or the like can be connected in a wireless manner. When providing the millimeter wave transmitter on the TV receiver 45 which is generally large-sized to some extent, a vertical position convenient for transmission can be naturally attained for reducing crosstalk in the millimeter wave transmission path. When mounting the millimeter wave transmitter on the TV receiver 45 as an adapter, a general input connector of the TV receiver 45 is provided on a lower portion of the back surface of the TV receiver 45 while providing a connector with the millimeter transmitter on an upper portion of the TV receiver 45, so that the millimeter wave transmitter can be mounted on a high position.

In particular, it is possible to regard the TV receiver 45 provided with or storing the millimeter wave transmitter as a main TV and turn on/off the millimeter wave transmitter in association with the switch of the main TV or through a remote controller for the main TV. In this case, the millimeter wave receiver having the control signal receiver 34 described with reference to the first embodiment may be provided on a sub TV such as a liquid crystal TV.

It is also conceivable to set the millimeter wave transmitter on a wall connector. In general, broadcasting waves may be directly transmitted to the TV receiver 45 close to the connector through millimeter waves while millimeter waves may be transmitted toward the ceiling from the millimeter wave transmitter for transmitting the millimeter waves to another indoor TV receiver through reflected waves reflected by a reflector set on the ceiling or the ceiling itself. The millimeter waves can be reflected by a ceiling board material employed in a general house. When setting the millimeter wave receiver mounted on or stored in the TV receiver 45 on a lower portion of the back surface of the TV receiver 45, millimeter waves from the millimeter wave transmitter set on the wall connector can be effectively received.

The millimeter wave communication system according to the present invention is not restricted to the structures directly described with reference to the first to third embodiments but can be properly combined with the millimeter wave transmitter, the millimeter wave receiver, the electronic apparatus and the repeater mentioned above.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A millimeter wave transmitter for performing millimeter wave radio transmission indoors, comprising:
   a connection unit connectable with an antenna receiving a plurality of broadcasting waves;
   a power supply circuit supplying driving power to said antenna through said connection unit;
   a broadcasting wave input circuit receiving said plurality of broadcasting waves through said connection unit and converting said broadcasting waves to broadcasting signals corresponding to said broadcasting waves respectively;
   a broadcasting wave modulation circuit up-converting said broadcasting signals to millimeter waves to be transmitted/received indoors;
   a millimeter wave transmission circuit transmitting said millimeter waves; and
   a frequency arranging circuit temporarily converting a radio frequency band of terrestrial waves below a frequency band of other of said broadcasting signals to an intermediate frequency band above said other broadcasting signals, thereby changing the frequency arrangement of said broadcasting signals.

2. The millimeter wave transmitter according to claim 1, wherein said millimeter waves are radio waves of the 60 GHz band.

3. The millimeter wave transmitter according to claim 1, wherein said broadcasting waves include at least one of radio waves of the radio frequency band of terrestrial waves and radio waves of an intermediate frequency band of satellite broadcasting.

4. The millimeter wave transmitter according to claim 1, further comprising:
   a video/audio signal processing circuit producing at least one of a video signal and an audio signal on the basis of internal information of said millimeter wave transmitter,
   a modulation circuit modulating said signal produced by said video/audio signal processing circuit to a broadcasting wave receivable in an electronic apparatus having a function of receiving broadcasting, and
   a mixing circuit mixing an output wave from said modulation circuit with said broadcasting waves input through said connection unit.

5. The millimeter wave transmitter according to claim 1, further comprising:
   an input interface inputting at least one of a video signal and an audio signal from outside,
   a modulation circuit modulating said signal input in said input interface to a broadcasting wave receivable in an electronic apparatus having a function of receiving broadcasting, and
   a mixing circuit mixing an output wave from said modulation circuit with said broadcasting waves input through said connection unit.

6. The millimeter wave transmitter according to claim 1, further comprising:
   a receiver for receiving a remote control signal from an electronic apparatus having a function of receiving broadcasting.

7. The millimeter wave transmitter according to claim 1, wherein
   the radio frequency band of terrestrial waves being temporarily converted by said frequency arranging circuit is separated from local oscillated waves when up converted in said millimeter wave transmission circuit.

8. A millimeter wave transmitter for performing millimeter wave radio transmission indoors, comprising:
- a broadcasting wave input circuit receiving a plurality of broadcasting waves and converting said broadcasting waves to broadcasting signals corresponding to said broadcasting waves respectively;
- a broadcasting wave modulation circuit up-converting said broadcasting signals to millimeter waves to be transmitted/received indoors;
- a millimeter wave transmission circuit transmitting said millimeter waves; and
- a receiving circuit receiving an external control signal and controlling a power supply to supply power to an antenna.

9. The millimeter wave transmitter according to claim 8, further comprising:
- a connection unit connectable with an antenna receiving said plurality of broadcasting waves, and
- a power supply circuit supplying driving power to said antenna through said connection unit, wherein
- said broadcasting wave input circuit receives said plurality of broadcasting waves through said connection unit, and
- said power supply circuit operates on the basis of said external control signal.

10. The millimeter wave transmitter according to claim 8, further comprising:
- a power control circuit controlling execution/interruption of power supply to a plurality of circuits included in said millimeter wave transmitter.

11. The millimeter wave transmitter according to claim 10, further comprising:
- a utilized apparatus storage circuit storing identification information input from said receiving circuit, wherein
- said identification information indicates identification information of an electronic apparatus utilizing output signals from said millimeter wave transmitter, and
- said power control circuit operates on the basis of said identification information.

12. A millimeter wave receiver for performing millimeter wave radio transmission indoors, comprising:
- a millimeter wave receiving circuit receiving millimeter waves, obtained by up-converting a plurality of broadcasting waves, to be transmitted/received indoors;
- a broadcasting wave demodulation circuit down-converting said millimeter waves to the frequency band of said broadcasting waves;
- a connection unit connectable with a connector provided on an electronic apparatus having a function of receiving broadcasting; and
- a power receptor circuit receiving driving power of said millimeter wave receiver through said connection unit in superposition with said broadcasting waves.

13. The millimeter wave receiver according to claim 12, wherein said millimeter waves are radio waves of the 60 GHz band.

14. The millimeter wave receiver according to claim 12, wherein
- said broadcasting waves include at least one of radio waves of the radio frequency band of terrestrial waves and radio waves of an intermediate frequency band of satellite broadcasting.

15. The millimeter wave receiver according to claim 12, further comprising:
- an input connector connected with an external antenna receiving said plurality of broadcasting waves, and
- a mixing/switching circuit outputting one of said broadcasting waves received by said input connector, output signals from said demodulation circuit, and signals obtained by mixing said broadcasting waves and said output signals.

16. The millimeter wave receiver according to claim 12, further comprising:
- an inverse frequency arranging circuit changing the frequency arrangement of output signals from said broadcasting wave demodulation circuit.

17. The millimeter wave receiver according to claim 12, further comprising:
- a video/audio signal processing circuit producing at least one of a video signal and an audio signal on the basis of internal information of said millimeter wave receiver,
- a modulation circuit modulating said signal produced by said video/audio signal processing circuit to a broadcasting wave receivable in said electronic apparatus, and
- a mixing circuit mixing an output wave from said modulation circuit with said broadcasting waves input through said connection unit.

18. The millimeter wave receiver according to claim 12, further comprising:
- a plurality of output terminals, and
- a distribution circuit for distributing output signals from said broadcasting wave demodulation circuit to each of said plurality of output terminals.

19. The millimeter wave receiver according to claim 12, wherein
- said connection unit is capable of at least one of rotation and bending when connected with said connector, and
- said millimeter wave receiving circuit includes at least one millimeter wave antenna having a variably settable direction.

20. The millimeter wave receiver according to claim 19, wherein
- said connection unit is capable of said rotation when connected with said connector,
- said millimeter wave receiving circuit includes a millimeter wave antenna arranged substantially in parallel with the axis of said rotation, and
- said millimeter wave antenna has a receiving surface rotatable about the axis of said rotation.

21. The millimeter wave receiver according to claim 20, wherein
- said connection unit is capable of said rotation when connected with said connector,
- said millimeter wave receiving circuit includes:
- a first millimeter wave antenna arranged substantially in parallel with the axis of said rotation, and
- a second millimeter wave antenna arranged substantially perpendicularly to the axis of said rotation, and
- each of said first and second millimeter wave antennas has a receiving surface rotatable about the axis of said rotation.

22. The millimeter wave receiver according to claim 19, wherein
- said connection unit is capable of said rotation when connected with said connector,
- said millimeter wave receiving circuit includes a millimeter wave antenna obliquely arranged with respect to the axis of said rotation, and
- said millimeter wave antenna has a receiving surface rotatable about the axis of said rotation.

23. The millimeter wave receiver according to claim 19, wherein
said connection unit is capable of said rotation on a first axis of rotation when connected with said connector,
said millimeter wave receiving circuit includes a millimeter wave antenna having a second axis of rotation in a direction substantially perpendicular to said first axis of rotation, and
said millimeter wave antenna has a receiving surface rotatable about said second axis of rotation.

24. The millimeter wave receiver according to claim 19, further comprising:
a receiving level detection circuit determining the receiving level in said millimeter wave receiving circuit and outputting a signal responsive to the result of determination,
a video/audio signal processing circuit producing at least one of a video signal and an audio signal as information signal for indicating a receiving state to said electronic apparatus,
a modulation circuit modulating said signal produced by said video/audio signal processing circuit to a broadcasting wave receivable in said electronic apparatus, and
a mixing circuit mixing said broadcasting wave output from said modulation circuit and said broadcasting waves input through said connection unit, wherein
said video/audio signal processing circuit changes said information signal in response to said output of said receiving level detection circuit.

25. The millimeter wave receiver according to claim 24, further comprising:
a display unit capable of making display responsive to said output of said receiving level detection circuit, and
said display unit executes said display also when said millimeter wave receiver is disconnected from said connector.

26. The millimeter wave receiver according to claim 12, further comprising:
a control signal receiving circuit receiving a control signal from said electronic apparatus through said connection unit.

27. The millimeter wave receiver according to claim 26, further comprising:
a transmission circuit transmitting a control signal for controlling a millimeter wave transmitter outputting said millimeter waves.

28. The millimeter wave receiver according to claim 27, wherein
said transmission circuit transmits the control signal received from said electronic apparatus to said millimeter wave transmitter.

29. The millimeter wave receiver according to claim 26, further comprising:
a power control circuit controlling execution/interruption of power supply to a plurality of circuits included in said millimeter wave receiver, wherein
said power control circuit interrupts power supply to said plurality of circuits included in said millimeter wave receiver when said control signal receiving circuit receives a receiving interruption signal from said electronic apparatus.

30. The millimeter wave receiver according to claim 12, further comprising:
a receiving circuit receiving an external control signal.

31. The millimeter wave receiver according to claim 30, wherein
said millimeter waves are output from a millimeter wave transmitter,
the millimeter wave receiver further comprising a transmission circuit transmitting a control signal for controlling said millimeter wave transmitter.

32. The millimeter wave receiver according to claim 30, further comprising:
a power control circuit controlling execution/interruption of power supply to a plurality of circuits included in said millimeter wave receiver, wherein
said power control circuit interrupts power supply to said plurality of circuits included in said millimeter wave receiver when said receiving circuit receives a receiving interruption signal from said electronic apparatus.

33. The millimeter wave receiver according to claim 12, wherein
said millimeter wave receiving circuit includes a non directional antenna for receiving millimeter waves.

34. The millimeter wave receiver according to claim 33, further comprising:
a control signal receiving circuit receiving a control signal from said electronic apparatus through said connection unit.

35. The millimeter wave receiver according to claim 34, further comprising:
a transmission circuit transmitting a control signal for controlling a millimeter wave transmitter outputting said millimeter waves.

36. The millimeter wave receiver according to claim 34, further comprising:
a power control circuit controlling execution/interruption of power supply to a plurality of circuits included in said millimeter wave receiver, wherein
said power control circuit interrupts power supply to said plurality of circuits included in said millimeter wave receiver when said receiving circuit receives a receiving interruption signal from said electronic apparatus.

37. The millimeter wave receiver according to claim 12, further comprising:
an inverse frequency arranging circuit changing the frequency arrangement of output signals from said broadcasting wave demodulation circuit so as to convert the broadcasting waves from the intermediate frequency band to the original frequency band of terrestrial waves.

38. An electronic apparatus capable of utilizing an output signal from a millimeter wave receiver, comprising:
a connector connected with said millimeter wave receiver;
a memory circuit storing information as to whether or not to utilize said output signal from said millimeter wave receiver in correspondence to a channel subjected to selection for receiving; and
a power supply circuit supplying driving power of said millimeter wave receiver through said connector, wherein
said power supply circuit supplies said driving power through said connector when a channel utilizing said output signal from said millimeter wave receiver is selected on the basis of said information stored in said memory circuit.

39. An electronic apparatus having a function of receiving television broadcasting including terrestrial waves, comprising:
a millimeter wave receiving circuit receiving millimeter waves, obtained by up-converting a plurality of broadcasting waves, output from a millimeter wave transmitter;
a broadcasting wave demodulation circuit down-converting said millimeter waves to the frequency band of said broadcasting waves;
an inverse frequency arranger receiving output signals of said broadcasting wave demodulation circuit and changing the frequency arrangement of the output signals of said broadcasting wave demodulation circuit; and a transmission circuit transmitting a control signal for controlling said millimeter wave transmitter.

40. The electronic apparatus according to claim 39, wherein said inverse frequency arranger converts the terrestrial waves from the intermediate frequency band of the broadcasting waves to the original frequency band of terrestrial waves.

41. A repeater connected to an antenna receiving broadcasting for making a relay to a terminal, comprising:

a broadcasting wave input circuit receiving a plurality of broadcasting waves through said antenna and converting said broadcasting waves to broadcasting signals corresponding to said broadcasting waves respectively;

a frequency arranging circuit receiving said broadcasting signals output from said broadcasting wave input circuit, and changing the frequency arrangement of said broadcasting signals by adjusting the frequency of at least one of said plurality of broadcast signals relative to at least one other of said plurality of broadcast signals;

a power supply circuit supplying power to said antenna;

a connection unit for connection with said terminal; and a power receptor circuit receiving driving power of said repeater through said connection unit.

42. The repeater according to claim 41, further comprising: a control signal receiver receiving a control signal from said terminal through said connection unit.

43. A millimeter wave communication system for performing millimeter wave radio transmission indoors, comprising:

a millimeter wave transmitter for transmitting millimeter wave signals in said millimeter wave radio transmission, said millimeter wave transmitter including:

a first connection unit connectable with an antenna receiving a plurality of broadcasting waves, a power supply circuit supplying driving power to said antenna through said first connection unit, a broadcasting wave input circuit receiving said plurality of broadcasting waves through said first connection unit and converting said broadcasting waves to broadcasting signals corresponding to said broadcasting waves respectively, a broadcasting wave modulation circuit up-converting said broadcasting signals to said millimeter wave signals to be transmitted/received indoors, and a millimeter wave transmission circuit transmitting said millimeter wave signals; and a millimeter wave receiver receiving said millimeter wave signals in said millimeter wave radio transmission, said millimeter wave receiver including:

a millimeter wave receiving circuit receiving said millimeter wave signals, a broadcasting wave demodulation circuit down-converting said millimeter wave signals to the frequency band of said broadcasting waves, a second connection unit connectable with a connector provided on an electronic apparatus having a function of receiving broadcasting waves, and a power receptor circuit receiving driving power of said millimeter wave receiver through said second connection unit.

44. A millimeter wave communication system for performing millimeter wave radio transmission indoors, comprising:

a repeater connected to an antenna receiving broadcasting for relaying a plurality of broadcasting waves, said repeater including:

a broadcasting wave input circuit receiving said plurality of broadcasting waves through said antenna and converting said broadcasting waves to broadcasting signals corresponding to said broadcasting waves respectively, a frequency arranging circuit changing the frequency arrangement of said broadcasting signals, a first power supply circuit supplying driving power to said antenna, and a first connection unit connectable with an external apparatus;

a first power receptor circuit receiving driving power of said repeater through said first connection unit;

a millimeter wave transmitter for receiving output signals of said repeater and transmitting millimeter wave signals in said millimeter wave radio transmission, said millimeter wave transmitter including:

a second connection unit connected with said first connection unit, a second power supply circuit supplying driving power to said repeater through said first and second connection units, a broadcasting wave modulation circuit receiving said broadcasting signals through said first and second connection units and up-converting said broadcasting signals to millimeter wave signals to be transmitted/received indoors, and a millimeter wave transmission circuit transmitting said millimeter wave signals; and a millimeter wave receiver for receiving said millimeter wave signals in said millimeter wave radio transmission, said millimeter wave receiver including:

a millimeter wave receiving circuit receiving said millimeter wave signals, a broadcasting wave demodulation circuit down converting said millimeter wave signals to the frequency band of said broadcasting waves, a third connection unit connectable with a connector provided in an electronic apparatus having a function of receiving broadcasting waves, and a second power receptor circuit receiving driving power of said millimeter wave receiver through said third connection unit.

45. The millimeter wave communication system according to claim 44, wherein said millimeter wave transmitter further includes a control signal transmission circuit transmitting a control signal through said second connection unit.

46. A millimeter wave transmitter for performing millimeter wave radio transmission indoors, comprising:

a connection unit connectable with an antenna receiving a plurality of broadcasting waves;

a power supply circuit supplying driving power to said antenna through said connection unit;

a broadcasting wave input circuit receiving said plurality of broadcasting waves through said connection unit and converting said broadcasting waves to broadcasting signals corresponding to said broadcasting waves respectively;

a broadcasting wave modulation circuit up-converting said broadcasting signals to millimeter waves to be transmitted/received indoors;

a millimeter wave transmission circuit transmitting said millimeter waves; wherein said millimeter wave transmitter is set indoors and is used in a system including a movable electronic apparatus mounted with a millimeter wave receiver for receiving said millimeter waves transmitted from said millimeter wave transmission circuit; and said movable electronic apparatus has a function of TV.

47. A millimeter wave transmitter for performing millimeter wave radio transmission indoors, comprising:
- a connection unit connectable with an antenna receiving a plurality of broadcasting waves;
- a power supply circuit supplying driving power to said antenna through said connection unit;
- a broadcasting wave input circuit receiving said plurality of broadcasting waves through said connection unit and converting said broadcasting waves to broadcasting signals corresponding to said broadcasting waves respectively;
- a broadcasting wave modulation circuit up-converting said broadcasting signals to millimeter waves to be transmitted/received indoors;
- a millimeter wave transmission circuit transmitting said millimeter waves; wherein
- said millimeter wave transmitter is set indoors in the vicinity of a ceiling and is used in a system including a movable electronic apparatus mounted with a millimeter wave receiver for receiving said millimeter waves transmitted from said millimeter wave transmission circuit; and
- said movable electronic apparatus has a function of TV.

48. A millimeter wave transmitter for performing millimeter wave radio transmission indoors, comprising:
- a connection unit connectable with an antenna receiving a plurality of broadcasting waves;
- a power supply circuit supplying driving power to said antenna through said connection unit;
- a broadcasting wave input circuit receiving said plurality of broadcasting waves through said connection unit and converting said broadcasting waves to broadcasting signals corresponding to said broadcasting waves respectively;
- a broadcasting wave modulation circuit up-converting said broadcasting signals to millimeter waves to be transmitted/received indoors;
- a millimeter wave transmission circuit transmitting said millimeter waves; wherein
- said millimeter wave transmitter is mounted on or stored in a first electronic apparatus and is used in a system including a movable second electronic apparatus mounted with a millimeter wave receiver for receiving said millimeter waves transmitted from said millimeter wave transmission circuit; and
- said movable second electronic apparatus has a function of TV.

49. The millimeter wave receiver according to claim 48, wherein said first electronic apparatus is a TV receiver.

* * * * *